(12) United States Patent
Schneider

(10) Patent No.: US 11,305,349 B2
(45) Date of Patent: Apr. 19, 2022

(54) METHOD AND APPARATUS FOR FORMING LAYERS OF PARTICLES FOR USE IN ADDITIVE MANUFACTURING

(71) Applicant: NANOGRANDE, Montréal (CA)

(72) Inventor: Juan Schneider, Montréal (CA)

(73) Assignee: NANOGRANDE, Montréal (CA)

( * ) Notice: Subject to any disclaimer, the term of this patent is extended or adjusted under 35 U.S.C. 154(b) by 559 days.

(21) Appl. No.: 16/084,407

(22) PCT Filed: Mar. 13, 2017

(86) PCT No.: PCT/CA2017/050328
§ 371 (c)(1),
(2) Date: Sep. 12, 2018

(87) PCT Pub. No.: WO2017/156623
PCT Pub. Date: Sep. 21, 2017

(65) Prior Publication Data
US 2019/0084045 A1    Mar. 21, 2019

Related U.S. Application Data

(60) Provisional application No. 62/307,937, filed on Mar. 14, 2016.

(51) Int. Cl.
| B22F 7/02 | (2006.01) |
| B29C 64/153 | (2017.01) |
| B29C 64/205 | (2017.01) |
| B29C 64/314 | (2017.01) |
| B29C 64/165 | (2017.01) |
| B22F 10/20 | (2021.01) |

(Continued)

(52) U.S. Cl.
CPC ............... B22F 7/02 (2013.01); B05C 19/04 (2013.01); B22F 1/0022 (2013.01);
(Continued)

(58) Field of Classification Search
CPC .... B05D 1/20; B05D 1/26; B05D 1/36; B22F 7/02; B22F 10/02; B22F 1/0022;
(Continued)

(56) References Cited

U.S. PATENT DOCUMENTS

| 7,241,341 B2 | 7/2007 | Picard et al. |
| 7,591,905 B2 | 9/2009 | Picard et al. |

(Continued)

FOREIGN PATENT DOCUMENTS

| CN | 1652881 A | 8/2005 |
| EP | 1641580 B1 | 6/2008 |

(Continued)

OTHER PUBLICATIONS

Extended European Search Report issued for patent application No. EP 17 765 608.9, dated Oct. 9, 2019 (9 pages).

(Continued)

*Primary Examiner* — Joseph S Del Sole
*Assistant Examiner* — Lawrence D. Hohenbrink, Jr.
(74) *Attorney, Agent, or Firm* — Bereskin & Parr LLP/S.E.N.C.R.L., s.r.l.

(57) ABSTRACT

A method and an apparatus for forming a particle layer are provided. The layering method includes injecting particles in an injection zone defined at a gas-liquid interface between a carrier liquid and an ambient gas, and controlling a flow of the carrier liquid along the gas-liquid interface to carry the particles downstream along a particle flow path from the injection zone to a layer formation zone. The method also includes accumulating the particles in the layer formation zone to gradually form the particle layer on the gas-liquid interface, and withdrawing the particle layer from the layer formation zone. The particle layer formed by the layering method and apparatus can be used to fabricate a three-dimensional object by additive manufacturing.

25 Claims, 18 Drawing Sheets

(51) Int. Cl.
  *B05C 19/04* (2006.01)
  *B22F 1/00* (2022.01)
  *B33Y 10/00* (2015.01)
  *B33Y 30/00* (2015.01)
  *B05D 1/20* (2006.01)
  *B33Y 40/00* (2020.01)

(52) U.S. Cl.
  CPC .......... *B22F 1/0059* (2013.01); *B22F 1/0081* (2013.01); *B22F 10/20* (2021.01); *B29C 64/153* (2017.08); *B29C 64/165* (2017.08); *B29C 64/205* (2017.08); *B29C 64/314* (2017.08); *B05D 1/20* (2013.01); *B22F 2203/00* (2013.01); *B33Y 10/00* (2014.12); *B33Y 30/00* (2014.12); *B33Y 40/00* (2014.12)

(58) Field of Classification Search
  CPC .. B22F 1/0059; B22F 1/0081; B22F 2203/00; B29C 64/314; B29C 64/153; B29C 64/165; B29C 64/205; B05C 19/04; B33Y 10/00; B33Y 30/00; B33Y 40/00
  USPC .......................................... 118/402; 425/375
  See application file for complete search history.

(56) References Cited

U.S. PATENT DOCUMENTS

| | | | |
|---|---|---|---|
| 2005/0129867 A1* | 6/2005 | Picard .................. | G11B 5/842 427/434.3 |
| 2005/0263934 A1 | 12/2005 | Chung et al. | |
| 2007/0231498 A1 | 10/2007 | Picard et al. | |
| 2009/0181162 A1* | 7/2009 | Schneider .............. | B82Y 30/00 427/9 |
| 2011/0135834 A1* | 6/2011 | Schneider ................ | B05D 1/20 427/420 |
| 2014/0170012 A1 | 6/2014 | Delisle et al. | |
| 2014/0363585 A1 | 12/2014 | Pialot et al. | |
| 2015/0258734 A1 | 9/2015 | Okamoto et al. | |

FOREIGN PATENT DOCUMENTS

| | | |
|---|---|---|
| GB | 709944 A | 6/1954 |
| JP | 2005525230 A | 8/2005 |
| JP | 2015174272 A | 10/2015 |
| WO | 199853920 A1 | 12/1998 |
| WO | 03/095108 A1 | 11/2003 |
| WO | 2008006211 A1 | 1/2008 |
| WO | 2011007087 A2 | 1/2011 |
| WO | 2014184303 A1 | 11/2014 |
| WO | 2015052275 A1 | 4/2015 |

OTHER PUBLICATIONS

International Search Report and Written Opinion for PCT/CA2017/050328, dated Jun. 22, 2017 (11 pages).

Chinese Patent Application No. 201780022882.3 First Office Action dated Jun. 18, 2020 (17 pages).

Japanese Office Action dated Apr. 22, 2021, for Application No. 2018-568467 and machine English translation.

* cited by examiner

200

202 — Injecting particles in an injection zone defined at a gas-liquid interface between a carrier liquid and an ambient gas

204 — Controlling a flow of the carrier liquid along the gas-liquid interface to carry the particles downstream along a particle flow path from the injection zone to a layer formation zone

206 — Accumulating the particles in the layer formation zone to gradually form the particle layer on the gas-liquid interface

208 — Withdrawing the particle layer from the layer formation zone

FIG. 2

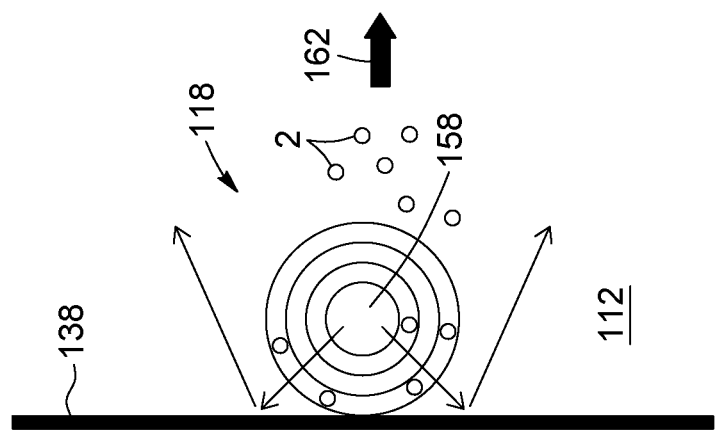
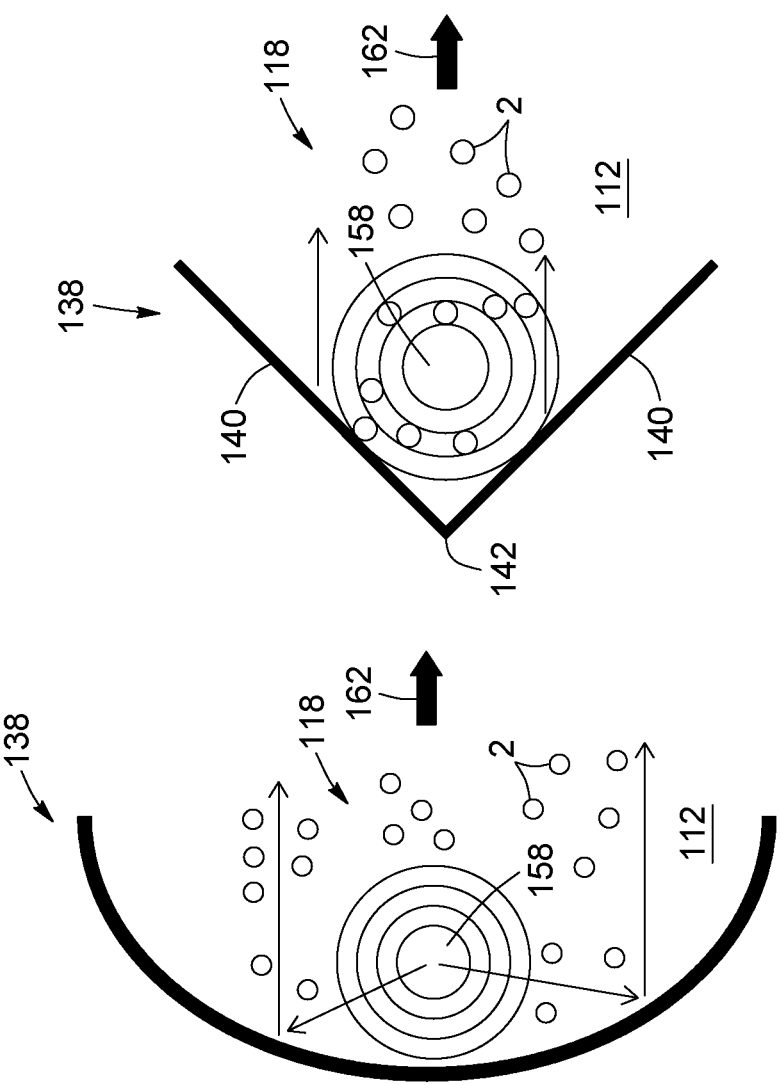

METHOD AND APPARATUS FOR FORMING LAYERS OF PARTICLES FOR USE IN ADDITIVE MANUFACTURING

CROSS-REFERENCE TO RELATED APPLICATIONS

This application is a National Phase Entry into the U.S. under 35 U.S.C. § 371 of and claims priority to PCT Application No. PCT/CA2017/050328, filed Mar. 13, 2017, which claims priority to U.S. Provisional Patent Application No. 62/307,937, filed Mar. 14, 2016, the entire contents of each being hereby incorporated by reference herein for all purposes.

TECHNICAL FIELD

The general technical field relates to preparation of particle layers and, in particular, to a method and apparatus for forming thin layers of particles suitable for use in additive manufacturing applications.

BACKGROUND

Various techniques are known for preparing, assembling and/or forming thin layers of small particles or molecules, such as, for example, ultrathin layers or monolayers of submicrometer-sized particles.

Document WO 1998/053920 A1 to Picard discloses a method and apparatus for the preparation of monolayers of particles or molecules. This document discloses a rotating cylinder where such particles are assembled, forming a monolayer. The basic principles of the method are based on the combination of three different processes. The first process is that it is necessary to use a thin liquid film, whose thickness must be in the micrometer (μm) range. The second process is the control of electrical charges of the particles in the thin liquid film in order to provoke the adsorption of particles at the gas-liquid interface without causing adsorption between them at the gas-liquid interface or in the thin liquid film itself. The third process is that, in order to create a force to drive particles against an edge for compression, the surface, on which there is the thin liquid film, is moved. This movement pushes the thin liquid film ahead and creates, through the liquid viscosity, a surface force that finally pushes the particles ahead.

Documents US 2011/0135834 A1 to Schneider et al. and U.S. Pat. No. 7,591,905 B2 to Picard et al. disclose methods for forming monolayers and thin films. In both documents, the disclosed methods rely on gravitational force as the driving force that pushes particles to form a monolayer. None of these methods allow for an axial control of the monolayer quality due to the lack of moving liquid control, thus compromising the lateral pressure control applied by the moving fluid to the particles. Moreover, the presence of an inclined plane tends to create ripples or rolling waves at the surface of the moving fluid, which affects the overall efficiency of the process by limiting or reducing the production speed and the quality and evenness of the formed ultrathin layer or monolayer. Furthermore, in the case of a single point of particle injection, ripples tend to increase while moving downward on the inclined plane, in turn affecting the monolayer quality and limiting the production speed as well.

Document EP 1 641 580 B1 to Teulet discloses a layering device for sintering of powders (metallic or ceramic) by laser. The device includes a feed tray permitting the powder to be stored and to be delivered in a controlled quantity to a grooved cylinder capable, on the one hand, of transferring and distributing the quantity of powder on the depositing tray during a first passage of the cylinder on the working zone and, on the other hand, of compacting the powder by a rolling movement of the cylinder during a second passage. The powder is then subjected to a laser beam. One disadvantage of this configuration is the size and the considerable cost of the feed tray. Another disadvantage arises from the fact that the length of the working zone is limited by the useful perimeter of the cylinder. Also, submicrometer-sized particles, or light particles in general, tend to pack and create uneven layers. For nanometer-sized particles, this approach generally cannot provide single layers nor allow a control of particle packing.

Document WO 2011/007087 A2 to Teulet discloses a layering device for melting powders by laser. This device includes a feed tray permitting powder to be stored and to be delivered in a controlled quantity to a scraper system capable of feeding the depositing tray and cylinder(s) capable of distributing and compressing the quantity of powder on the depositing tray. The powder is then subjected to a laser beam. One disadvantage of this configuration is the size and the considerable cost of the feed tray as well as the inherent and necessary complexity of the machine arising from the large number of tools to be controlled, for example scraper(s), distribution and/or compacting cylinder(s), rams for the trays, and the like. Moreover, scraping or pushing particles required them to be as rounded as possible to ensure fluidity during pushing or rolling of particles over a working zone. Fibers, elongated or platelets could not be used guaranteeing smoothness, evenness of particle distribution. Non-round particles can create clogging and uneven deposits and finally uneven pressure density distribution of the fabricated layer.

Document US 2005/0263934 A1 to Chung et al. discloses a layering device for sintering powders by laser. This device includes feeding and dosing means permitting the powder to be delivered in a controlled manner in the vicinity of a working zone. Feeding takes place by gravity from a stock of powder situated above. A scraper permits the regulation of the thickness of a mass of powder, which is then subjected to a preheating operation. A rotary cylinder then permits the quantity of preheated powder to be transferred and distributed on the working zone. A quantity of powder may likewise be deposited on the cover of the carriage carrying the cylinder from one side of the working zone to the other, and is accordingly only applied during the return of the cylinder. One disadvantage of this configuration is the risk of a part (even a very small part) of the powder being retained on the cover and subsequently falling into the working zone during the passage of the carriage above the bed of powder. This risk is not acceptable in the context of industrial use and highly likely to happen for very fine, submicrometric particles where van der Waals and electrostatic forces become significantly more important than the gravitational force. As in WO 2011/007087 A2, scraping or pushing particles required them to be as rounded as possible to ensure fluidity during pushing or rolling of particles over a working zone. Moreover, submicron particles cannot be pushed mechanically to obtain a very thin layer.

Document US 2014/0363585 A1 to Pialot et al. discloses a layering device and associated process for sintering powders by laser. The process is characterized in that storage means, feeding means and dosing means are integral with distributing means, while the distributing means travel over the working zone. Again, feeding takes place by gravity from a stock of powder situated above, which means that particles must be big enough and dense enough to be carried downward by gravity from the layering device to the working zone. However, for particles in the range of a few nanometers (nm) in diameter, gravity effect is generally so small that the particles tend to remain suspended in the air above, rather than being delivered to, the working zone.

Document US 2014/0170012 A1 to Delisle et al. discloses an additive manufacturing apparatus including a material supply system that delivers layers of partially sintered pulverant material to an additive manufacturing station. This document also discloses a method of forming an object using layers of partially sintered pulverant material, which are selectively sintered to form the object. The pulverant material comes in the form of a rolled film that is continuously deposited as coupons one after the other over the working zone. One disadvantage of this configuration is that there is a limiting thickness layer and sintering level to ensure no rupture of the film during processing and deposition on the working zone. Furthermore, this approach requires double sintering, thus increasing costs and process requirements.

In a same technology field as US 2014/0170012 A1, a matrix material is required to have a film. There are some known technologies which attempt to mitigate the difficulties associated with powder feedstock. For example, sinterpaper is a commercially available product that consists of a paper fiber with embedded metallic sinterable powders. During laser sintering, the paper fiber is burned off, leaving only the sintered metal. However, sinterpaper may leave carbonaceous residue, and suffers from uneven distribution of pulverant material throughout the paper fibers.

Another challenge in conventional techniques is the difficulty, and sometimes the impossibility, of achieving a homogeneous thickness and density for the powder layer over the entire surface area (length, width) of the working zone. Moreover, compaction control at each layer can be challenging, especially with small particle size where other forces such as electrostatic and van der Waal forces become important, thereby promoting clogging and powder stickiness, and, in turn, affecting the layer evenness, flatness and/or uniformity.

A further challenge in conventional techniques is that particle size and density must be large enough to be pulled by gravity and by a mechanical device flattening the deposited layer of particles. If particles are too small, for instance of a few nanometers in size, gravity is no longer the main force acting on the particles, thus making it difficult or even impossible to achieve deposition with quality, uniformity and thickness control. In some cases, ultrafine powder can contaminate the equipment and even the environment by air dispersion after injection, thereby making the system potentially dangerous for the operators and the equipment. Also, very small particles of metals can become flammable and/or explosive due to high surface volume ratio in contact with oxygen of the air, making the feeding tray and the whole system dangerous.

Various challenges therefore remain in the development of techniques for forming thin particulate layers.

SUMMARY OF THE DISCLOSURE

The present description generally relates to techniques for forming thin layers of particles such as, for example, ultrathin layers or monolayers of submicrometer-sized particles that are suitable for use in additive manufacturing processes and applications.

In accordance with an aspect, there is provided a method for forming a particle layer. The layering method includes the steps of:
injecting particles in an injection zone defined at a gas-liquid interface between a carrier liquid and an ambient gas;
controlling a flow of the carrier liquid along the gas-liquid interface to carry the particles downstream along a particle flow path from the injection zone to a layer formation zone;
accumulating the particles in the layer formation zone to gradually form the particle layer on the gas-liquid interface; and
withdrawing the particle layer from the layer formation zone.

In some implementations, the layering method can involve similar physical-chemical principles to those involved in the Langmuir-Blodgett film deposition technique.

In some implementations, the injecting step includes injecting the particles in the injection zone or site as a powder, a dispersion, a solution, a suspension, a heterogenous mixture, or a mixture or combination thereof.

In some implementations, the layering method further includes, prior to the injecting step, a step of preparing a particle suspension or solution by suspending or dissolving the particles in a suspension liquid or solvent. In some implementations, the particle suspension or solution can be formed just prior to the injection step. Alternatively, in other implementations, the particle suspension or solution is formed at an earlier time and then stored until needed. In some implementations, the preparing step includes controlling a concentration of the particles in the particle suspension or solution. In some implementations, the suspension liquid or solvent has a surface tension lower than a surface tension of the carrier liquid.

In some implementations, the injecting step includes a step of controlling an injection rate of the particles in the injection zone.

In some implementations, the injecting step includes injecting the particles at a single injection point in the injection zone. In other implementations, the injecting step includes injecting the particles at a plurality of spaced-apart injection points in the injection zone. In further implementations, the injecting step includes injecting the particles along an injection line in the injection zone. In some implementations, the injection line is substantially perpendicular to the particle flow path.

In some implementations, the controlling step includes controlling the flow of the carrier liquid substantially without gravity flow. In such implementations, the gas-liquid interface generally extends along a horizontal plane, perpendicular to the gravitational force.

In some implementations, the controlling step includes controlling a flow of an upper portion of the carrier liquid extending from the gas-liquid interface down to an operating depth below the gas-liquid interface. More particularly, in some implementations, the flow of the upper portion of the carrier liquid is caused by the displacement of a substrate located at a distance d below the gas-liquid interface and moving at a speed v parallel to the gas-liquid interface. In such a configuration, due to the inherent viscosity $\mu$ of the carrier liquid, the displacement of the moving substrate produces a lateral force F acting on the particles along the gas-liquid interface. In some implementations, the force F acting on a layer of particles having a surface A can be expressed as follows: $F/A = \mu v/d$, where F/A represents a pressure P acting on the particles. For example, in a non-limiting embodiment where the carrier liquid is characterized by a relatively low viscosity (e.g., less than 10 centipoises), the depth d of the moving substrate under the gas-liquid interface can be of the order of a millimeter or less to produce a force F that is large enough to transport the particles efficiently to the layer formation zone.

In some implementations, controlling the flow of the upper portion of the carrier liquid includes a step of operating at least one flow control device at the operating depth and at an operating speed along the particle flow path. In some implementations, the step of operating the at least one flow control device includes selecting at least one of the operating depth and the operating speed based on a viscosity of the carrier liquid.

In some implementations, the step of operating the at least one flow control device includes operating a plurality of flow control devices. In some implementations, the step of operating the plurality of flow control devices includes independently operating each one of the flow control devices. In some implementations, the step of operating the plurality of flow control devices includes operating at least two of the flow control devices at different operating speeds.

In some implementations, the controlling step includes a step of limiting a phenomenon of blast injection at the gas-liquid interface. In some implementations, the step of limiting or containing the phenomenon of blast injection at the gas-liquid interface includes adjusting the flow of the carrier liquid along the gas-liquid interface in accordance with a wave expansion rate of the particles injected in the injected zone.

In some implementations, the accumulating step includes a step of restricting the flow of the carrier liquid in the layer formation zone. For example, in some implementations, the step of accumulating the particles in the layer formation zone includes creating controlled particle traffic jam or restriction effect in the layer formation zone.

In some implementations, the withdrawing step includes a step of removing the particle layer gradually and concurrently with the accumulating step. Alternatively, in other implementations, the withdrawing step includes a step of removing the particle layer from the layer formation zone only once the particle layer or a portion thereof is fully formed. In some of these other implementations, the method can include, once the particle layer is fully formed and during the removing step, the steps of stopping the injecting step and pushing downstream the particle layer against an upstream edge thereof.

In some implementations, the withdrawing step includes a step of controlling a withdrawing speed of the particle layer from the layer formation zone.

In some implementations, the withdrawing step includes a step of controlling a lateral pressure in the particle layer. In some implementations, the lateral pressure of the withdrawn particle layer can be controlled to control the layer density and prevent or help prevent the formation of ripples, rolling waves and other instabilities at the surface of the carrier liquid. In some implementations, the step of controlling the lateral pressure in the particle layer includes adjusting a ratio between the flow of the carrier liquid along the gas-liquid interface and a withdrawal rate of the particle layer from the layer formation zone.

In some implementations, the layering method can include a step of performing a specific monitoring of the layer formation process. In some scenarios, this step can involve monitoring a sort of "traffic jam" effect, which can impede or restrict the flow or motion of the particles, lead to their accumulation in the layer formation zone, and result in the formation of the particle layer. In such scenarios, the monitoring of the layer formation process can involve a monitoring of the injection zone where the particles (e.g., in the form of a powder, a suspension or a solution) are injected at the gas-liquid interface. For example, in some implementations, the accumulating step includes monitoring a profile of the gas-liquid interface along the particle flow path as the particles accumulate in the layer formation zone.

In some implementations, the layering method further includes a step of controlling, either manually or automatically, at least one of a composition, a pressure and a supply rate of the ambient gas. In some implementations, controlling the composition of the ambient gas can involve injecting an inert gas (e.g., nitrogen) to lower the oxygen content of the ambient gas in view of preventing or at least reducing oxidation and other unwanted chemical reactions with the particles during the layering and/or manufacturing processes. For example, the composition of the ambient gas can be controlled from normal atmosphere to only inert gas. In some implementations, the composition of the ambient gas can also or instead be controlled in such a way as to cause or promote a particular chemical reaction with the particles during the layering and/or manufacturing processes. Such scenarios can involve injecting a specific gas species in the ambient gas to cause or promote the particular chemical reaction. In some implementations, the layering method can be performed in a hermetically sealed environment to prevent or help prevent any uncontrolled, strong, detrimental or undesired reactions between the particles and the oxygen present in the ambient gas. In some implementations, the layering method can be performed at atmospheric pressure, while in other implementations, the layering method can be performed at a pressure that is higher or lower than atmospheric pressure, for example in partial vacuum.

In some implementations, the layering method further includes a step of controlling an equilibrium surface affinity of the particles at the gas-liquid interface to maintain the particles at the gas-liquid interface. In some implementations, the step of controlling the equilibrium surface affinity includes a step of adjusting a hydrophobicity or hydrophilicity of at least one of the particles and the carrier liquid.

In some implementations, the carrier liquid includes water, an aqueous solution, a liquid metal, or a mixture thereof.

In some implementations, the particles are composed of metals, alloys, semiconductors, ceramics, dielectrics, organic materials, polymers, or a mixture thereof.

In some implementations, the particles are between about 1 nanometer and about 10 nanometers in diameter, or between about 10 nanometers and about 100 nanometers in diameter, or between about 0.1 micrometer and about 1 micrometer in diameter, or between about 1 micrometer and about 10 micrometers in diameter, or between about 10 micrometers and about 100 micrometers in diameter, or between about 0.1 millimeter and about 1 millimeter in diameter, or between about 1 micrometer and about 100 micrometers in diameter. In some implementations, the particles are between about 1 nanometer and 1 millimeter in diameter.

In some implementations, interfacial tension forces established between the injected particles, the carrier liquid and the ambient gas cause the injected particles to spread out rapidly along the gas-liquid interface. In such implementations, as the spreading of the particles occurs, the flow imparted to the carrier liquid along the gas-liquid interface acts to drive the particles toward the layer fabrication zone.

In accordance with another aspect, there is provided an apparatus for forming a particle layer. The layering apparatus includes:

- a vessel for receiving a carrier liquid such that, when the carrier liquid is present in the vessel, the carrier liquid defines a gas-liquid interface with an ambient gas;
- an injection assembly configured to inject particles in an injection zone defined at the gas-liquid interface;
- a flow control assembly disposed in the vessel such that, when the carrier liquid is present in the vessel, the flow control assembly is submerged at least partly in the carrier liquid and configured to control a flow of the carrier liquid along the gas-liquid interface, the flow of the carrier liquid carrying the particles downstream along a particle flow path from the injection zone to a layer formation zone where the particles accumulate and gradually form the particle layer on the gas-liquid interface; and
- a transfer assembly configured to withdraw the formed particle layer from the layer formation zone.

In some implementations, the injection assembly is configured to control an injection rate of the particles in the injection zone. In some implementations, the injection assembly is configured to inject the particles in the injection zone as a powder, a dispersion, a solution, a suspension, a heterogenous mixture, or a combination thereof.

In some implementations, the injection assembly includes a single injector. In some implementations, the single injector is configured to inject the particles at a single injection point in the injection zone. In other implementations, the single injector is configured to inject the particles along an injection line in the injection zone. In further implementations, the injection line is substantially perpendicular to the particle flow path. Alternatively, the injection assembly includes a plurality of injectors. In some implementations, the plurality of injectors includes a linear array of spaced-apart injectors. In some implementations, the injection assembly includes an atomizer.

In some implementations, the layering apparatus can include a dose or rate controller configured to control a concentration of particles in the solution/suspension (e.g., in a scenario where the particles solution/suspension is prepared just before the injection) and/or a delivery rate of the solution/suspension in the injection zone. The provision of a dose controller can allow the particle density to be varied within one layer and/or between successive layers.

In some implementations, the layering apparatus further includes a particle storage unit connected to the injection assembly for storing the particles and supplying the particles to the injection assembly prior to injection thereof in the injection zone. For example, the particle storage unit can store the particles as a powder, a suspension or a solution. In some implementations, the layering apparatus can include a carrier liquid storage unit for storing the carrier liquid to be delivered in the vessel and onto which the particles are to be deposited.

In some implementations, the flow control assembly is configured to control the flow of the carrier liquid along the gas-liquid interface substantially without gravity flow.

In some implementations, the flow control assembly can be operable to control, at least one of the formation speed, the lateral pressure, the homogeneity and the density or porosity of the formed particle layer. It will be appreciated that homogeneous layers with spatially uniform density or lateral pressure are often desirable or even required in additive manufacturing. Depending on the application or use, the formed particle layers can have close-packed density or exhibit a certain porosity. In some implementations, the flow control assembly can also or alternatively be operable to regulate, reduce, mitigate and/or control a phenomenon of blast injection, which can arise when a particle suspension or solution is injected at a single point on the gas-liquid interface, by controlling the fluid displacement downstream of the injection site. In some implementations, the flow control assembly can be operable to provide or achieve a controlled accumulation of the particles in the layer formation zone.

In some implementations, the flow control assembly is configured to control a flow of an upper portion of the carrier liquid extending from the gas-liquid interface down to an operating depth below the gas-liquid interface. In such implementations, the flow control assembly is configured to cause a displacement of the carrier liquid, the displacement resulting in a motion of the gas-liquid interface that entrains the injected particles toward the layer formation zone. In some implementations, this control over the flow of such a top portion of the carrier liquid underneath the gas-liquid interface can eliminate or help eliminate the phenomenon of uncontrolled side pressure on the particles at the gas-liquid interface by directing the particles toward the layer formation zone and by promoting a controlled assembly of particles into a layer.

In some implementations, the flow control assembly includes at least one flow control device, each flow control device being located at the operating depth and being operated at an operating speed parallel to the gas-liquid interface.

In some implementations, the operating depth of each one of the at least one flow control device is less than one centimeter.

In some implementations, the flow control assembly can include at least one moving substrate submerged at least partly in the carrier liquid and controlling the displacement of the carrier liquid along the gas-liquid interface. For example, in some implementations, the at least one flow control device includes at least one belt conveyor. Each belt conveyor can include a set of rollers, at least one of which being a powered roller, and an endless conveyor belt mounted for movement about the rollers. Depending on the application, the flow control assembly can include a single belt conveyor or a plurality of belt conveyors. In the latter scenario, the belt conveyors may or may not all have the same operating depth, operating speed, dimensions, and/or orientation. Each belt conveyor can extend in the carrier liquid below the injection zone and/or the layer formation zone. In some implementations, the provision of a plurality of independently controlled belt conveyors submerged in the carrier liquid can enhance the uniformity of the formed layer, notably at the edge thereof. For example, a non-uniform layer can result from an uneven single point of injection of the particles at the gas-liquid interface. In particular, the provision of a plurality of independently controlled belt conveyors can allow a specific and enhanced control of the shock or expansion wave arising due to the phenomenon of blast injection. In some implementations, the one or more moving belt conveyors can be operable to control at least one of the rate or speed at which the layer is formed, the lateral pressure inside the layer, the thickness of the layer, the density of the layer, and the accumulation of particles at the layer formation zone.

In some implementations, the at least one flow control device consists of a single flow control device. Alternatively, in other implementations, the at least one flow control device can consist of a plurality of flow control devices. In some implementations, the plurality of flow control devices extends in a side-by side relationship parallel to the particle flow path.

In some implementations, the operating speeds of the flow control devices are not all equal. In some implementations, each one of the flow control devices is operated independently from the remainder of the flow control devices.

In some implementations, the flow control assembly includes a fixed substrate submerged in the carrier liquid and a pump submerged at least partly in the carrier liquid upstream of the injection zone.

In some implementations, the transfer assembly includes a barrier against which the particles accumulate particles and gradually form the particle layer on the gas-liquid interface. In some implementations, the transfer assembly is located at a downstream end of the vessel.

In some implementations, the transfer assembly includes a rotating cylinder having a peripheral surface, the rotating cylinder being located at a downstream end of the layer formation zone and configured to convey the particle layer out of the layer formation zone along the peripheral surface thereof. For example, in some implementations, the particle layer conveyed on the rotating cylinder can be transferred to the working zone of an additive manufacturing system. In some implementations, the rotating cylinder can be rotated at a constant angular speed so as to maintain a constant lateral pressure inside the particle layer during its transfer.

In some implementations, the transfer assembly includes a belt conveyor including a conveyor belt, the belt conveyor being located at a downstream end of the layer formation zone and configured to convey the particle layer out of the layer formation zone along the conveyor belt for further processing or storage. For example, in some implementations, the particle layer conveyed on the belt conveyor can be transferred to the working zone of an additive manufacturing system. In some implementations, the belt conveyor can be driven at a constant speed in order to maintain a constant lateral pressure inside the particle layer during its transfer.

In some implementations, the transfer assembly can form a capillary bridge to deposit the formed layer gently and smoothly on top of previously withdrawn, transferred and deposited layers, for example in the working zone of an additive manufacturing area.

In some implementations, the transfer assembly is configured to withdraw the particle layer gradually and concurrently with the accumulation of the particles in the layer formation zone and the gradual formation of the layer of particles on the gas-liquid interface. Alternatively, in other implementations, the transfer assembly can be configured to withdraw the particle layer from the layer formation zone only once the particle layer or a portion thereof is fully formed.

In some implementations, the layering apparatus further includes an ambient gas control unit configured to control at least one of a composition, a pressure and a supply rate of the ambient gas.

In some implementations, the layering apparatus further includes a barrier provided at a location least partly upstream of the injection zone and configured to promote the flow of the particles downstream along the particle flow path. In some implementations, the barrier is concave facing downstream. In some implementations, the barrier is movable and configured to move downstream along the particle flow path to push the particle layer toward and onto the transfer assembly for withdrawal of the same.

In some implementations, the layering apparatus can include a control or processing unit. The control unit can be implemented in hardware and/or software and be operable to control and execute, at least partially, the functions required to operate the different components of the layering apparatus, such as the injection assembly, the flow control assembly and/or the transfer assembly. For example, the control unit can be operable to control the amount of solution/suspension to be delivered by the injection assembly and/or the flow and the lateral pressure imparted by the flow control assembly, and, in turn, to control the density and the thickness of the resulting particle layer.

In accordance with another aspect, there is provided an additive manufacturing method for fabricating a three-dimensional (3D) object. The additive manufacturing method includes the steps of:

forming a particle layer using the method as disclosed herein;

transferring the particle layer withdrawn from the layer formation zone to a working zone;

joining a predetermined portion of the transferred layer together in a selective manner to form, in the working zone, one of a plurality of discrete cross-sectional regions that cumulatively form the 3D object; and repeating the forming, transferring and joining steps a plurality of times to stack the plurality of discrete cross-sectional regions one on top of the other, and build up, layer by layer, the 3D object.

In some implementations, the joining step can include at least one of sintering, melting, fusing, polymerizing, gluing, contacting, merging, connecting, binding, bonding or adhering the predetermined portion of the transferred layer together.

In some implementations, the additive manufacturing method can include the steps of: transferring the fabricated 3D object to a cleaning area; cleaning the fabricated 3D object (e.g., in an ultrasonic bath) to remove therefrom unused particles (e.g., unsintered or unfused particles); and recycling the unused particles removed from the fabricated 3D object, for example for use in a subsequent application of the additive manufacturing method.

In some implementations, the step of transferring the layer of particles to the working zone can include synchronizing the speed at which the layer is transferred from the layer formation zone to the working zone with the speed at which the working zone is translated. In such a case, the relative speed between the layer formation zone and the working zone is made to substantially coincide with the speed at which the layer is transferred to the working zone. This synchronization ensures or helps ensure that each layer is transferred to the working zone in a continuous manner.

In some implementations, the step of forming the layer of particles can allow obtaining a particle layer whose density and/or porosity is adapted to the specific characteristics and/or requirements of the particular additive manufacturing process. For example, the step of forming the layer of particles can allow for a control over the particle separation and density in the discrete cross-sectional regions that cumulatively form the 3D object.

In some implementations, the additive manufacturing method can use particle layers formed of nanoscale particles and be characterized in that the energy required to join or merge the particles is reduced due to the melting-point depression phenomenon, according to which the melting point of a particle decreases with a reduction in particle size.

In accordance with another aspect, there is provided an additive manufacturing system including a layering apparatus as disclosed herein.

In some implementations, the additive manufacturing system can act on the particle layers formed by the layering apparatus in order to allow 3D printing or manufacture of an object. The additive manufacturing system can use an energy beam (e.g., electromagnetic radiation such as a laser beam), a beam of particles (e.g., an electron beam) or an adhesion promoter (e.g., a polymer) to achieve joining (e.g., merging, sintering, melting, fusing, polymerizing, gluing or binding) of the layered particles. Non-limiting examples of additive manufacturing processes include selective laser melting, direct laser metal sintering, stereolithography, digital light projection, fused deposition modeling, electron-beam projection lithography and electron beam melting. In some implementations, the layered particles used in the additive manufacturing system are nanoparticles.

In some implementations, the final 3D object can be moved from the working zone to a cleaning assembly. In some implementations, the cleaning assembly can include an ultrasonic bath, a recycling bin or container, a hub of particles and a gas chamber. The ultrasonic bath can be used to remove unused particles (e.g., the unsintered or unfused particles) from the fabrication supporting plate, while the recycling bin can be used to collect and store the removed unused particles for subsequent reutilization. The hub of particles can be embodied by a centrifuge device to concentrate particles and extract them with reduced amount of cleaning liquid from the ultrasonic bath. The gas chamber can control the ambient atmosphere of the cleaning assembly, for example, from normal atmosphere to an atmosphere with no or a low level of oxygen. In some implementations, the final 3D object can be returned to the fabrication chamber through a controlled atmosphere. In some implementations, the cleaning assembly may be a separate component of the additive manufacture system.

In accordance with another aspect, there is provided a use of a layer of particles formed by the layering method and/or the layering apparatus as disclosed herein for additive manufacturing, for example for fabricating a three-dimensional (3D) object by additive manufacturing.

In accordance with another aspect, there is provided a use of the layering apparatus as disclosed herein in an additive manufacturing system.

It is noted that other method and process steps may be performed prior, during or after the above-described steps. The order of one or more of the steps may also differ, and some of the steps may be omitted, repeated and/or combined.

Other features and advantages of the present description will become more apparent upon reading of the following non-restrictive description of specific embodiments thereof, given by way of example only with reference to the accompanying drawings.

BRIEF DESCRIPTION OF THE DRAWINGS

FIG. 2 is a flow diagram of a method for forming a particle layer, in accordance with an exemplary embodiment.

FIGS. 9A to 9C are schematic representations of three examples of an upstream barrier for use in a layering apparatus.

DETAILED DESCRIPTION OF DISCLOSED EXEMPLARY EMBODIMENTS

Figure 1:
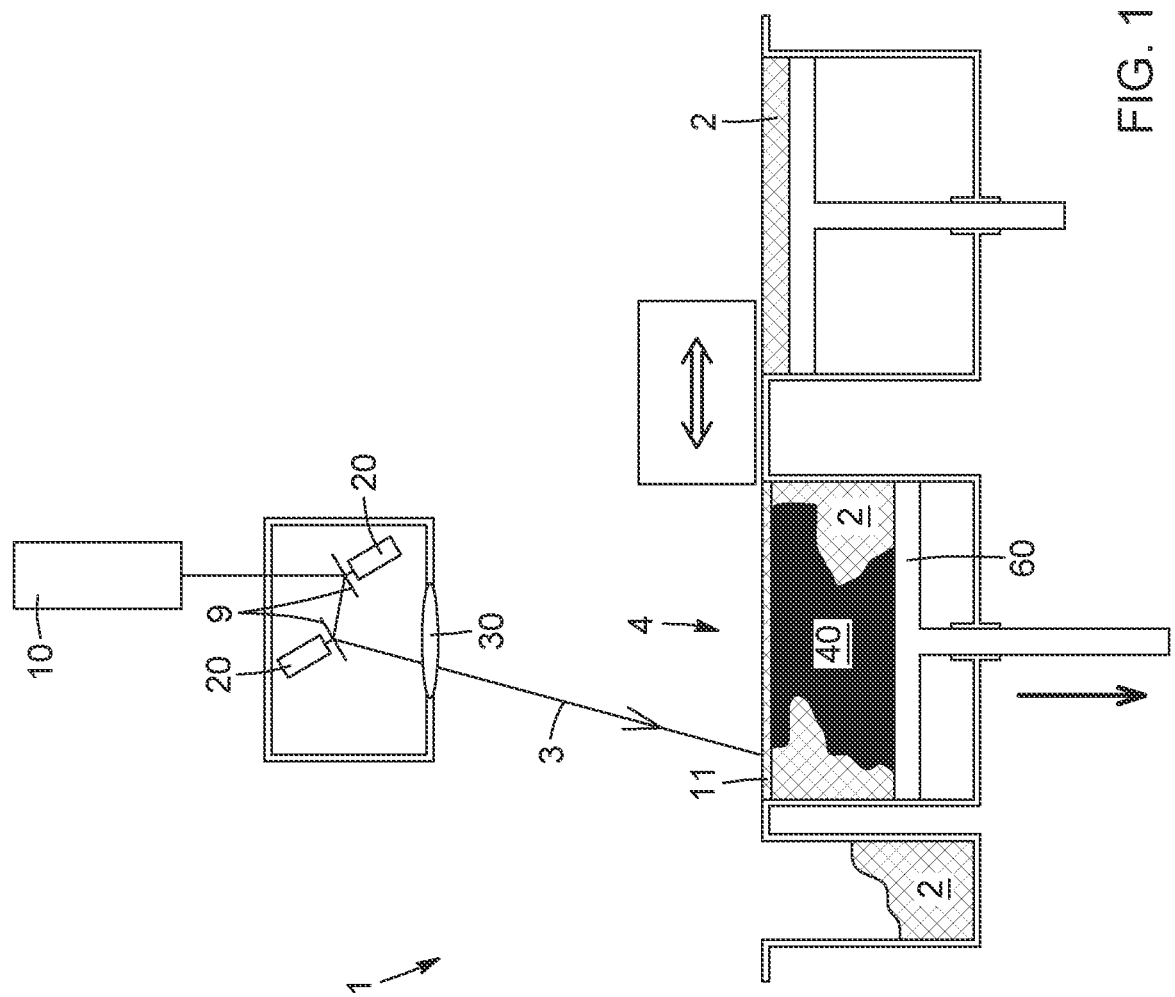
FIG. 1 is a schematic representation of a conventional additive manufacturing system.

In the following description, similar features in the drawings have been given similar reference numerals, and, in order to not unduly encumber the figures, some elements may not be indicated on some figures if they were already identified in preceding figures. It should also be understood herein that the elements of the drawings are not necessarily depicted to scale, since emphasis is placed upon clearly illustrating the elements and structures of the present embodiments. In particular, it is noted that the particles and layers of particles depicted in some of the drawings have been highly magnified in size for clarity purposes.

The present description generally relates to techniques for forming layers of particles, for example ultrathin layers or monolayers of submicrometer-sized particles.

In some aspects, there are provided a method and an apparatus for forming a particle layer. For convenience, the present method and apparatus can, in some instances, be referred to as a "layering method" and as a "layering apparatus", respectively. In some implementations, the layering method can involve physicochemical principles like those involved in the Langmuir-Blodgett film deposition technique. Various implementations of the layering method and apparatus are described below.

The present techniques can be used in various applications that require or can benefit from uniform, homogeneous, mechanically and chemically stable, thin particle layers produced at a faster rate. For example, various techniques disclosed herein may be applied to or implemented in particle-based additive manufacturing processes that use successive depositions of layers of particulate material to build up a 3D object, structure or part. In this regard, other aspects of the present description include an additive manufacturing method for fabricating a 3D object; an additive manufacturing system including a layering apparatus disclosed herein; a use of a layer of particles formed by the layering method and/or the layering apparatus disclosed herein for additive manufacturing; and a use of the layering apparatus as disclosed herein in an additive manufacturing system.

Referring to FIG. 1, there is illustrated a schematic representation of an example of a conventional additive manufacturing system 1 for fabricating a three-dimensional (3D) object 40. The additive manufacturing system 1 includes a source of energy, embodied for example by a laser source 10. The laser source 10 is operable to emit a laser beam 3. The orientation of the laser beam 3 relative to a working zone 4 can be adjusted by means of mirrors 9 controlled by respective galvanometers 20. An optical lens 30 can be provided to focus the laser beam 3 at a working zone 4 in order to heat an upper layer 11 of particles 2 (e.g., powders) according to a precise pattern to cause selective melting of the particles 2. After treatment of the particle layer 11 by the beam 3, a working tray 60 is lowered by a unit thickness and covered with a new particle layer, continuing in this manner in order to form the object 40 in a layer-by-layer manner. Depending on the types of energy beam and particles used, the thickness of an individual particle layer 11 can vary from a few micrometers (e.g., 1 µm) to several hundred micrometers (e.g., 500 µm). Once the fabrication of the 3D object 40 has been completed, that is, once the hundreds or thousands of layers necessary for its construction have been successively solidified, the object 40 can be removed from the working zone 4.

Non-limiting examples of additive manufacturing processes which can benefit from the present techniques can include additive manufacturing by joining of layered particles using an energy beam (e.g., electromagnetic radiation such as a laser beam), a beam of particles (e.g., an electron beam) and/or an adhesion promoter (e.g., a polymer) acting on a layer in a working zone, where a 3D object is built layer by layer from the particle layers stacked as a multilayer structure. In the present description, the term "joining" is intended to encompass, without being limited to, sintering, melting, fusing, polymerizing, gluing, contacting, merging, connecting, binding, adhering, integrally bonding and any other process or combination of processes by which the particles of a particle layer can be brought together, reversibly or irreversibly, to form one cross-sectional region or layer of the 3D object. In such implementations, the present techniques can provide systems and processes for layering, that is, for preparing the bed of particles that is to be joined layer by layer by an energy beam, a particle beam or an adhesion promoter to create a 3D object. However, the layering techniques disclosed herein are not limited to additive manufacturing applications, but could be used in other applications. Non-limiting examples of such other applications include implementations in photonic devices (e.g., photonic crystals), biosensors, biocaptors, and other applications that require or that could benefit from enhanced surface properties (e.g., in terms of adhesion, repulsion and/or friction control).

In the present description, the term "particle", or "particulate matter", refers broadly to any discrete, individual mass, structure or phase, or any collection thereof, that is suspended, dispersed, mixed, contained or otherwise provided in a host medium. For example, the particles can be molecules, colloids, nanoclusters or micro clusters, fibers, powders, polymers, aggregates and agglomerations of particles, or combinations thereof. It will be understood that, in principle, the term "particle" is not meant to be restricted with respect to size, shape, phase or composition. For example, in some embodiments, the particles can be solid particles suspended in a liquid medium, while in other embodiments the particles can be solid particles injected directly at the gas-liquid interface, without using a host liquid (e.g., as a powder). The particles can be organic, inorganic or some combinations thereof. The particles may be composed of various kinds of materials including, without limitation, metals, alloys, semiconductors, ceramics, dielectric materials, organic materials, polymers, proteins and other biological structures, oxides, graphene, carbon nanotubes, molecules, and the like. In some implementations, the layers can be formed of a combination of materials, and different layers can have different compositions. The particles can be spherical, however non-spherical particles (e.g., elliptical or elongated particles) are also possible.

Depending on the application or use, the particles can have an average particle size ranging from the millimeter scale down to the nanometer scale, covering six orders of magnitude in size. In some embodiments, the particles are nanoparticles or microparticles, or a combination thereof. In the present description, the term "nanoparticle" refers to a particle having an average particle size that can be measured on a nanoscale. For example, in a non-limitative embodiment, the synthesized nanoparticles can be smaller than about 100 nm in diameter, or between about 1 nm and about 100 nm in diameter, or between about 1 nm and about 10 nm in diameter, or between about 10 nm and about 100 nm in diameter. As also used herein, the term "microparticle" refers to a particle having an average particle size that can be measured on a microscale. For example, in a non-limitative embodiment, the synthesized microparticles can be between about 0.1 µm to about 100 µm in diameter, or between about 0.1 µm and about 1 µm in diameter, or between about 1 µm and about 100 µm in diameter, or between about 1 µm and about 10 µm in diameter, or between about 10 µm and about 100 µm in diameter. In this regard, those skilled in the art will recognize that the definitions of the terms "nanoparticle" and "microparticle" in terms of size range, as well as the dividing line between the two terms, can vary depending on the technical field under consideration, and are not meant to be limiting.

In the present description, the term "layer" and derivatives thereof are intended to refer broadly to a substantially planar arrangement of particles disposed on an underlying surface in a continuous or discontinuous manner. The arrangement of particles may be closed-packed or not, and may be uniform or not. The term "layer" is meant to include both a single layer of particles (i.e., a one-particle-thick monolayer), multiple layers of particles (i.e., a layer that is several particles thick), as well as collections of intermingled particles, fibers and/or molecules. The term "thin layer" can refer to a layer having a thickness ranging from about 1000 µm to about 1 µm, while the term "ultrathin layer" can refer to a layer having a thickness less than about 1 µm. It is also noted that the term "layer" is intended to encompass both an ensemble of discrete particles disposed on a surface and an ensemble of intermingled and/or interacting particles disposed on a surface (e.g. a film). In particular, the term "layer" is intended to encompass, but is not limited to, the term "film".

Referring to FIG. 2, there is provided a flow diagram of an embodiment of a method 200 for forming a particle layer. For example, the method 200 of FIG. 2 can be implemented in layering apparatus 100 such as the one illustrated in FIG. 4, or in another layering apparatus 100.

Figure 3:
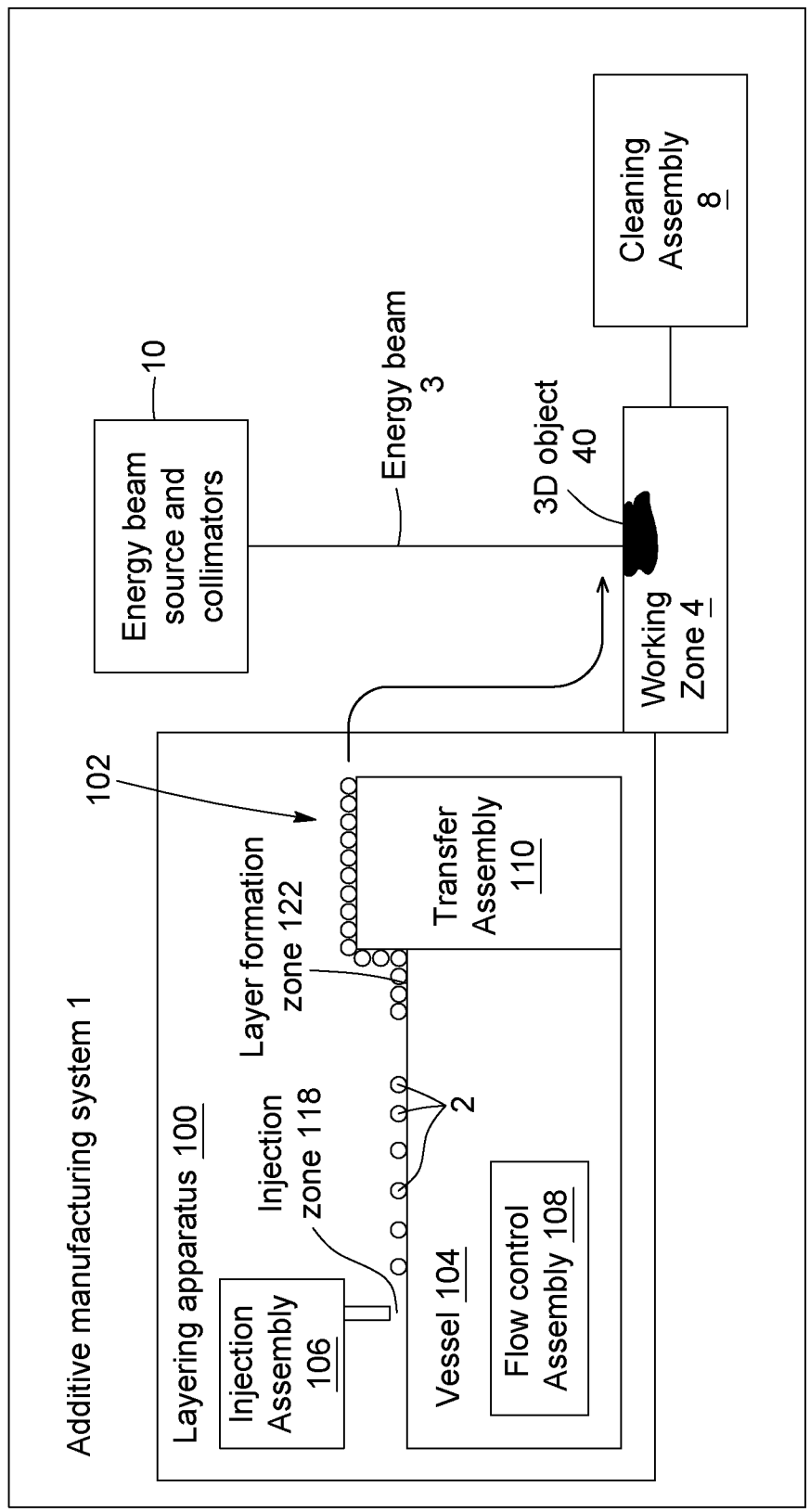
FIG. 3 is a schematic functional block representation of an additive manufacturing system, the additive manufacturing system including an exemplary embodiment of a layering apparatus.

Referring to FIG. 3, a schematic functional block representation of an additive manufacturing system 1 is illustrated. The additive manufacturing system 1 includes an exemplary embodiment of a layering apparatus 100 for forming a layer 102 of particles 2. In addition to the layering apparatus 100, the additive manufacturing system 1 of FIG. 3 also includes a working zone 4, a cleaning assembly 8 and an energy beam source 10. The energy beam source 10 is configured to emit an energy beam 3 (e.g., a light beam such as a laser beam, or a particle beam such as an electron beam) onto the working zone 4. Depending on the application, the energy beam source 10 and the manner of controlling the energy beam 3 may or may not be similar to those illustrated in FIG. 1.

Figure 4:
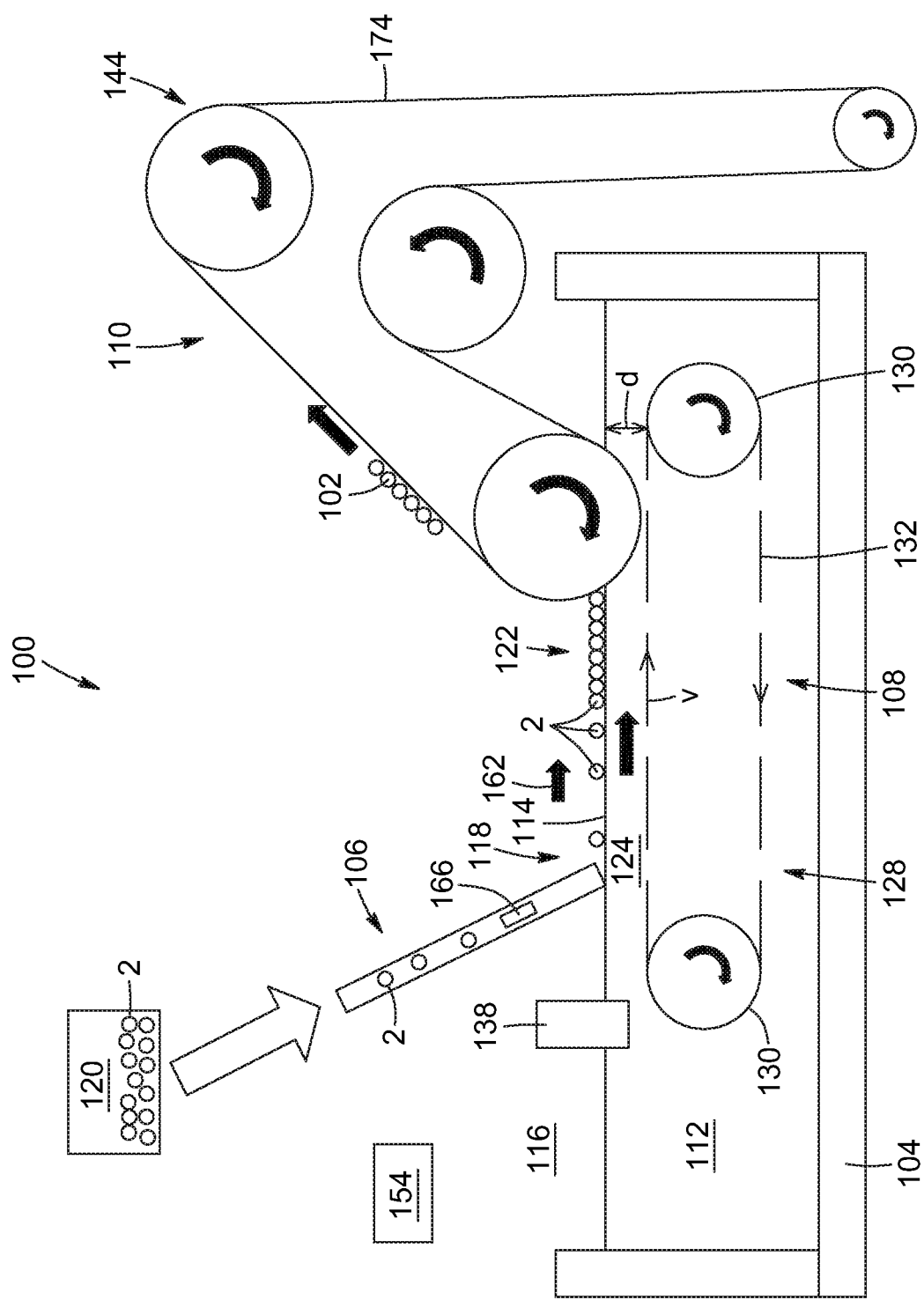
FIG. 4 is a schematic side view of a layering apparatus, in accordance with an exemplary embodiment.

Referring to FIG. 4, a non-limiting exemplary embodiment of a layering apparatus 100 for forming a layer 102 of particles 2 is shown. Broadly described, the layering apparatus 100 can include a vessel 104, an injection assembly 106, a flow control assembly 108, and a transfer assembly 110. More regarding the structure, configuration and operation of these and other possible components of the layering apparatus 100 will be described in greater detail below in conjunction with the flow diagram of the layering method 200 depicted in FIG. 2.

In FIG. 4, the vessel 104 is configured to receive a carrier liquid 112 (or carrier fluid), such that, when the carrier liquid 112 is present in the vessel 104, the carrier liquid 112 defines a gas-liquid interface 114 (or gas-fluid interface) with an ambient or environmental gas 116. The vessel 104 can be embodied by any kind of container or reservoir which can receive and contain the carrier liquid 112. In one implementation, the vessel 104 can have a surface area of about 40 cm×25 cm and a depth of about 5 cm, although other implementations can use different dimensions. It is noted that the carrier liquid 112 can consist of any liquid or fluid whose surface tension is sufficiently high to keep the injected particles 2 at the gas-liquid interface 114. For example, and without limitation, the carrier liquid 112 can include water, an aqueous solution, a liquid metal (e.g., mercury), or a mixture thereof.

Depending on the particular application or use, the ambient gas 116 can have different compositions. For example, in some implementations, the ambient gas 116 can be normal air, while in other implementations the ambient gas 116 can have lower oxygen content than that of normal air for the purpose of preventing or at least reducing oxidation and other unwanted chemical reactions with the particles during the layering process. In some implementations, the layering apparatus 100 can include an ambient gas control unit 154 operable to control at least one of a composition, a pressure and a supply or flow rate, if any, of the ambient gas 116.

Referring still to FIG. 4, in some implementations, the gas-liquid interface 114 defines a generally flat surface that extends along a horizontal plane. The gas-liquid interface 114 corresponds to the boundary between the carrier liquid 112 and the ambient gas 116. In the present description, the term "horizontal" refers to a plane or a direction extending substantially perpendicularly to the direction of the force of gravity. It is noted that the term "horizontal" is meant to cover both truly horizontal and substantially or nearly horizontal. Accordingly, in some implementations, the flow control assembly 108 is configured to control the flow of the carrier liquid 112 along the gas-liquid interface 114 substantially without gravity flow, where the term "gravity flow" refers to the downward flow of material caused primarily or exclusively by gravitational force. In some implementations, the provision of a flat horizontal gas-liquid interface 114 along which the interfacial liquid flows other than by gravity can prevent or help prevent the formation of ripples, rolling waves and other instabilities at the surface of the carrier liquid 112 that could adversely affect the uniformity, quality and/or production rate of the formed layer 102.

Referring to FIG. 2, the layering method 200 includes a step 202 of injecting particles in an injection zone defined at the gas-liquid interface between the carrier liquid and the ambient gas. In the present description, the term "at the gas-liquid interface" is meant to include both on or slightly below the gas-liquid interface. Depending on the application, various injection configurations can be used. Non-limiting examples of injection configurations include injecting the particles at a single injection point, at a plurality of spaced-apart injection points, or along an injection line which may or may not be perpendicular to the particle flow path. In some implementations, the injecting step 202 can include a step of controlling an injection rate of the particles in the injection zone. In some implementations, the method 200 can include, prior to the injecting step 202, a step of preparing a particle suspension or solution by suspending or dissolving the particles in a suspension liquid or solvent, which can include a step of controlling a concentration of the particles in the particle suspension or solution.

In the embodiment of FIG. 4, the injection assembly 106 is configured to inject the particles 2 into an injection zone 118 defined at the gas-liquid interface 114, preferably in a smooth and gentle manner. The particles 2 can be deposited in the injection zone 118 as a powder, a dispersion, a solution, a suspension, a heterogeneous mixture, or a combination or mixture thereof. In the case, of a suspension or a solution, the suspension liquid or solvent in which the particles 2 are suspended or dissolved can be an organic liquid such as, for example, butanol, methanol, isopropanol, acetone, and the like, or an inorganic liquid such as for example, water, molten salts, sulfuric acid, and the like. In some implementations, the suspension liquid or solvent is selected so as to evaporate relatively rapidly after the injection and/or so as not to remain in large amount in the carrier liquid 112. In some implementations, the suspension liquid or solvent has a surface tension that is lower than a surface tension of the carrier liquid 112.

Figure 5A:
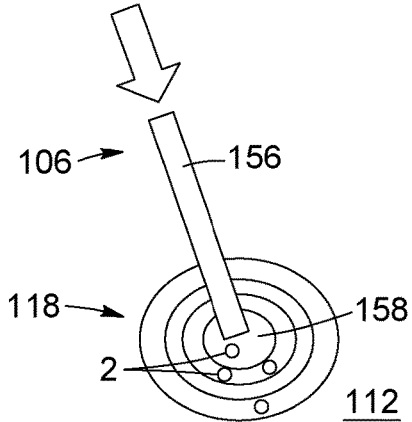
FIGS. 5A to 5D are schematic representations of non-limiting examples of types of injection assembly for use in different exemplary embodiments of a layering apparatus.
Figure 5B:
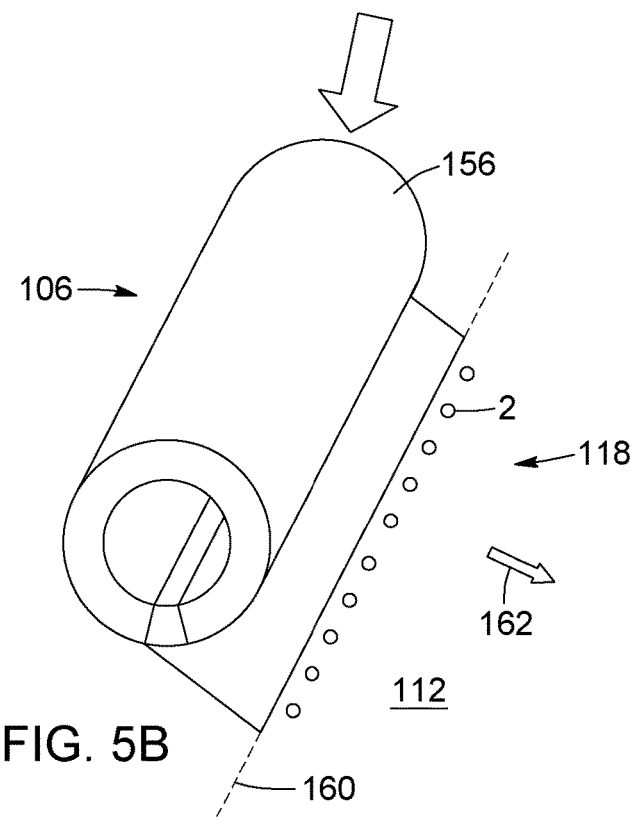
Figure 5C:
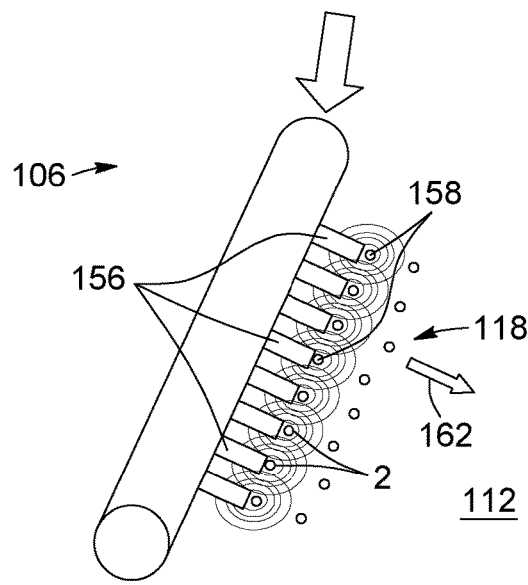
Figure 5D:
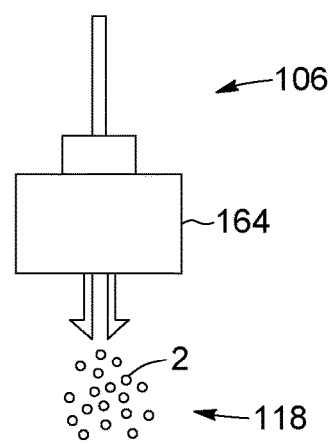

Referring now to FIGS. 5A to 5D, depending on the particular application or use, the injection assembly 106 can have different configurations. In FIG. 5A, the injection assembly 106 includes a single injector 156 configured to inject the particles 2 at a single injection point 158 in the injection zone 118. In FIG. 5B, the injection assembly 106 includes a single injector 156 configured to inject the particles 2 along a substantially continuous injection line 160 in the injection zone 118. The injection line 160 may or may not be perpendicular to the particle flow path 162, that is, to the flow applied or imparted to the carrier liquid 112 by the flow control assembly. More particularly, for the single injector 156 illustrated in FIG. 5B, the injection of particles 2 occurs through an aperture or filter defined longitudinally along the periphery of a manifold having a cylindrical body portion. In FIG. 5C, the injection assembly 106 includes a plurality of injectors 156 arranged as a linear array of spaced-apart injectors 156 configured to inject the particles 2 at a plurality of spaced-apart injection points 158 in the injection zone 118. As in a FIG. 5B, the array injectors 156 can be provided in a manifold having a cylindrical body portion aligned perpendicularly to the particle flow path 162 applied or imparted to the carrier liquid 112 by the flow control assembly. Referring to FIG. 5D, in yet other implementations, the injection assembly 106 can include an atomizer 164, for example an ultrasonic atomizer. It is further noted that, in some implementations, the particles can be injected at the gas-liquid interface in a powdered form, where conventional powder deposition processes can be used. In some implementations, the particles are injected or deposited at the gas-liquid interface, rather than being injected inside the carrier liquid and subsequently adsorbed from the carrier liquid toward the gas-liquid interface.

Returning to FIG. 4, in some implementations, the layering apparatus 100 can include a particle storage unit 120 connected to the injection assembly 106 and configured to store the particles 2 and supply the particles 2 to the injection assembly 106. The particle storage unit 120 can store the particles 2, for example as a powder, a suspension or a solution, prior to the injection thereof in the injection zone 118. The particle storage unit 120 can be directly or indirectly connected to the injection assembly 106 to allow the particles 2 to be supplied from the particle storage unit 120 to the injection assembly 106. Depending on the particular application or use, the particle suspension, solution or powder can be formed just prior to the injection step or at an earlier time and then be stored in the particle storage unit 120 until needed.

Referring still to FIG. 4, in some implementations, the injection assembly 106 can include a dose or injection rate controller 166 configured to control a concentration of particles 2 in the solution/suspension and/or a delivery rate of the solution/suspension in the injection zone 118. In some cases, the dose or injection rate controller 166 can control the layer transferring linear speed in accordance with the working zone deposition of the layer from the layer fabrication zone to the working zone, and/or control the density within individual layers and/or between successively formed layers. In some implementations, the layering apparatus 100 can include a carrier liquid storage unit (not shown) for storing the carrier liquid 112 to be delivered in the vessel 104.

After injection, the particles generally tend to spread out from the injection zone to occupy the available surface area of the gas-liquid interface. This natural particle diffusion is caused at least partly by interfacial tension forces established at the gas-liquid interface between the injected particles, the host liquid (if any), the carrier liquid and the ambient gas. In some implementations of the method, the particles are maintained at the gas-liquid interface as they spread out away from the injection zone by controlling the equilibrium surface affinity of the particles on each side of the gas-liquid interface. In some implementations, controlling the equilibrium surface affinity of the particles with the carrier liquid to ensure that the particles remain on the gas-liquid interface can involve a step of adjusting a hydrophobicity or hydrophilicity of at least one of the particles, the carrier liquid and, if any, the host liquid (e.g., the suspension liquid or solvent in which the particles are suspended or dissolved). For example, in a scenario where the carrier liquid is an aqueous solution, ensuring that the injected particles are maintained at the gas-liquid interface can involve increasing the hydrophobicity of the particles and/or of the host liquid (if any). It may also be possible to attach a hydrophobic molecule to the particles to increase their hydrophobic character. Of course, it will be understood that various techniques can be employed to ensure or help ensure that the injected particles remain at the surface of the carrier liquid.

It is noted that when the particles are injected as a suspension or a solution, the suspension liquid or solvent can evaporate and/or penetrate into the carrier liquid, thus leaving the deposited particles at the gas-liquid interface. However, in some embodiments, it is also possible to choose or fabricate a suspension liquid or solvent that will not evaporate completely and that will leave a desired residual material on or in the formed layer. Such residual material can be useful to avoid or reduce mechanical stresses from building up during the layering process in scenarios where successive layers are deposited non-destructively one on top of the other in a working zone (e.g., the working zone of an additive manufacturing system such as that of FIG. 1).

Returning to FIG. 2, the method 200 also includes a step 204 of controlling a flow of the carrier liquid along the gas-liquid interface to carry the particles downstream along a particle flow path from the injection zone to a layer formation zone.

In FIG. 4, the flow control assembly 108 is disposed in the vessel 104 such that, when the carrier liquid 112 is present in the vessel 104, the flow control assembly 108 is submerged at least partly in the carrier liquid 112 and configured to control a flow of the carrier liquid 112 along the gas-liquid interface 114. The flow of the carrier liquid 112 produced by the flow control assembly 108 acts to carry the particles 2 downstream along a particle flow path 162 from the injection zone 118 to a layer formation zone 122 where the particles 2 accumulate and progressively form the particle layer 102 on the gas-liquid interface 114. As the spreading of the particles 2 occurs, the flow imparted to the carrier liquid 112 along the gas-liquid interface 114 acts to drive or entrain the particles 2 toward the layer formation zone 122.

In the present description, the term "flow control assembly" should be construed broadly as referring to any appropriate device or combination of devices submerged at least partly in the carrier liquid received in the vessel and configured or operable to establish and maintain (e.g., mechanically, hydraulically, electrically, or otherwise) a downstream flow of at least an upper portion of the carrier liquid located below the gas-liquid interface. In other words, referring to FIG. 4, the flow control assembly 108 is configured to cause a displacement of the carrier liquid 112 resulting in a motion of the gas-liquid interface 114 that entrains the particles 2 toward the layer formation zone 122. In some implementations, the flow control assembly 108 is configured to control a flow of an upper portion 124 of the carrier liquid 112, the upper portion 124 extending from the gas-liquid interface 114 down to an operating depth d below the gas-liquid interface 114. In some implementations, the flow control assembly 108 comprises at least one flow control device 128, each flow control device being located at the operating depth d and being operated at an operating speed v parallel to the gas-liquid interface 114. In some implementations, operating the at least one flow control device 128 can include selecting the operating depth d and/or the operating speed v based on the viscosity p of the carrier liquid 112. In some implementations, controlling the flow of the upper portion 124 of the carrier liquid 112 underneath the gas-liquid interface 114 can eliminate or help eliminate the phenomenon of uncontrolled side pressure on the particles 2 at the gas-liquid interface 114 by directing the particles 2 toward the layer formation zone 122 and by promoting a controlled assembly of the particle layer 102.

In the present description, the term "downstream" refers to a direction that generally corresponds to the direction of the flow applied to the carrier liquid by the flow control assembly along the particle flow path, while the term "upstream" generally refers to the direction that is opposite to the direction of the flow applied to the carrier liquid by the flow control assembly along the particle flow path. More particularly, referring to FIG. 4, the injection zone 118 is located upstream of the layer formation zone 122.

Figure 6:
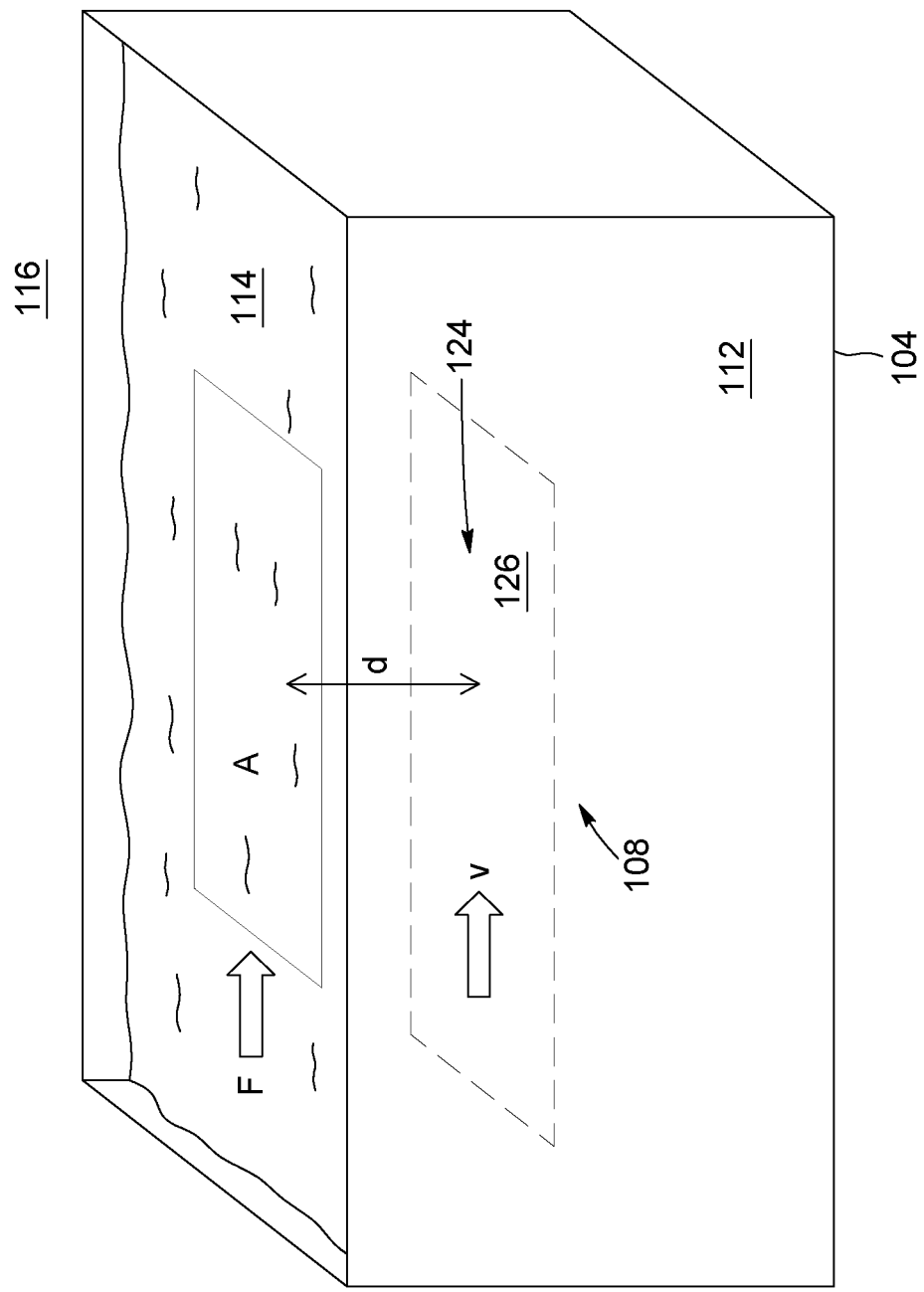
FIG. 6 is a schematic representation of the lateral or horizontal force F acting on a surface A of the gas-liquid interface due to the motion component of the flow control assembly located at an operating depth d below the gas-liquid interface and moving at an operating speed v parallel to the gas-liquid interface.
Figure 7:
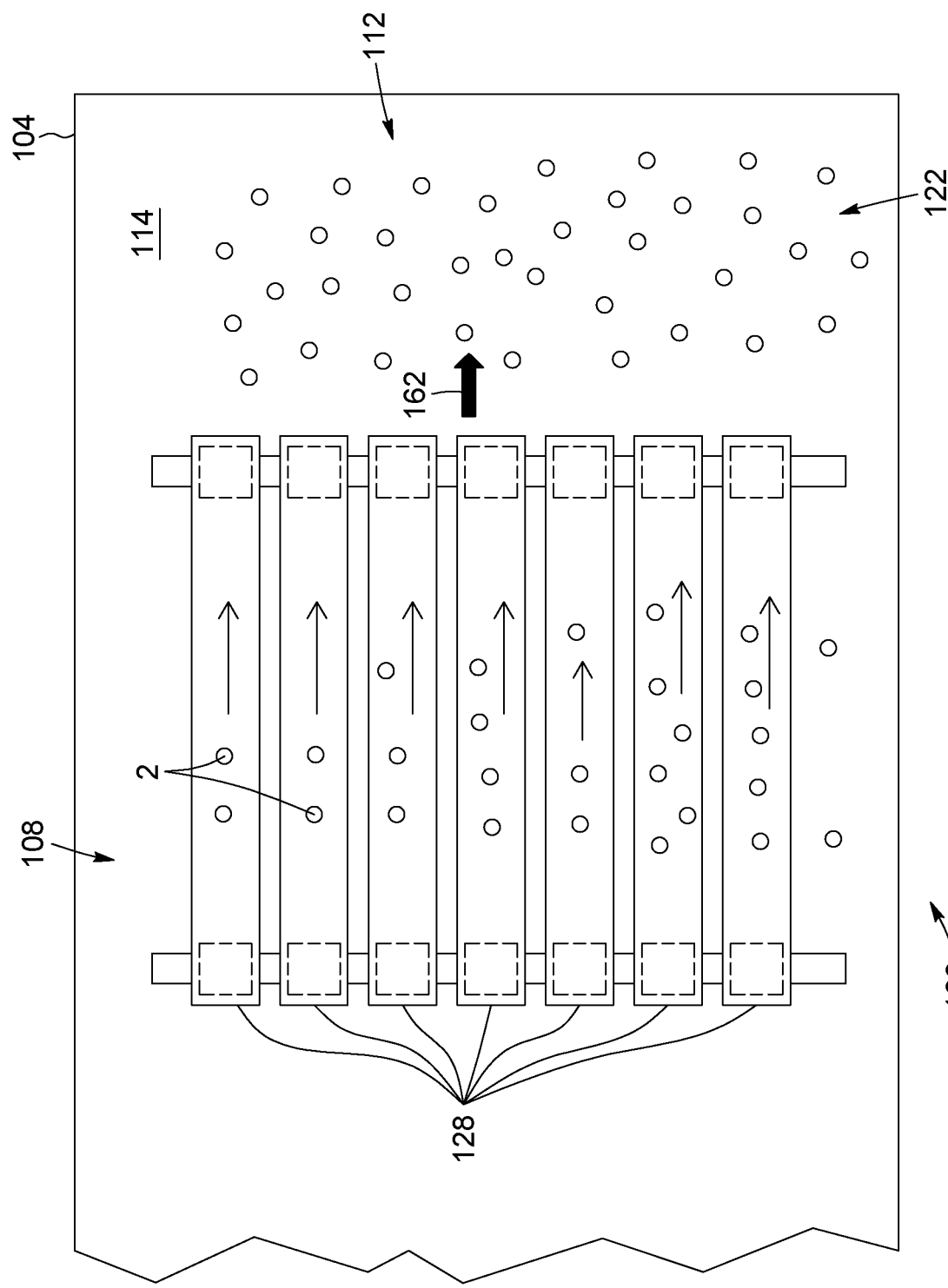
FIG. 7 is a schematic top view representation of a flow control assembly of an exemplary embodiment of a layering apparatus, the flow control assembly including a plurality of independently controlled belt conveyors.
Figure 8:
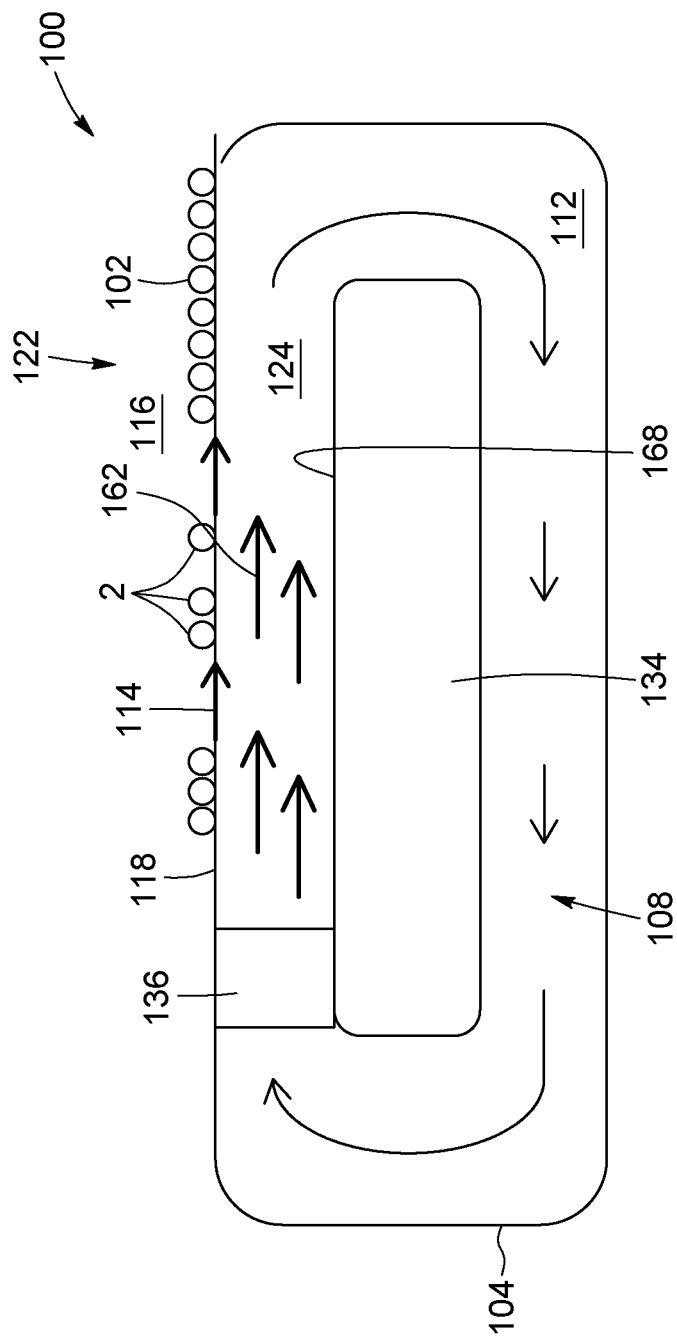
FIG. 8 is a schematic representation of another example of a flow control assembly of a layering apparatus, in accordance with an exemplary embodiment.
Figure 10:
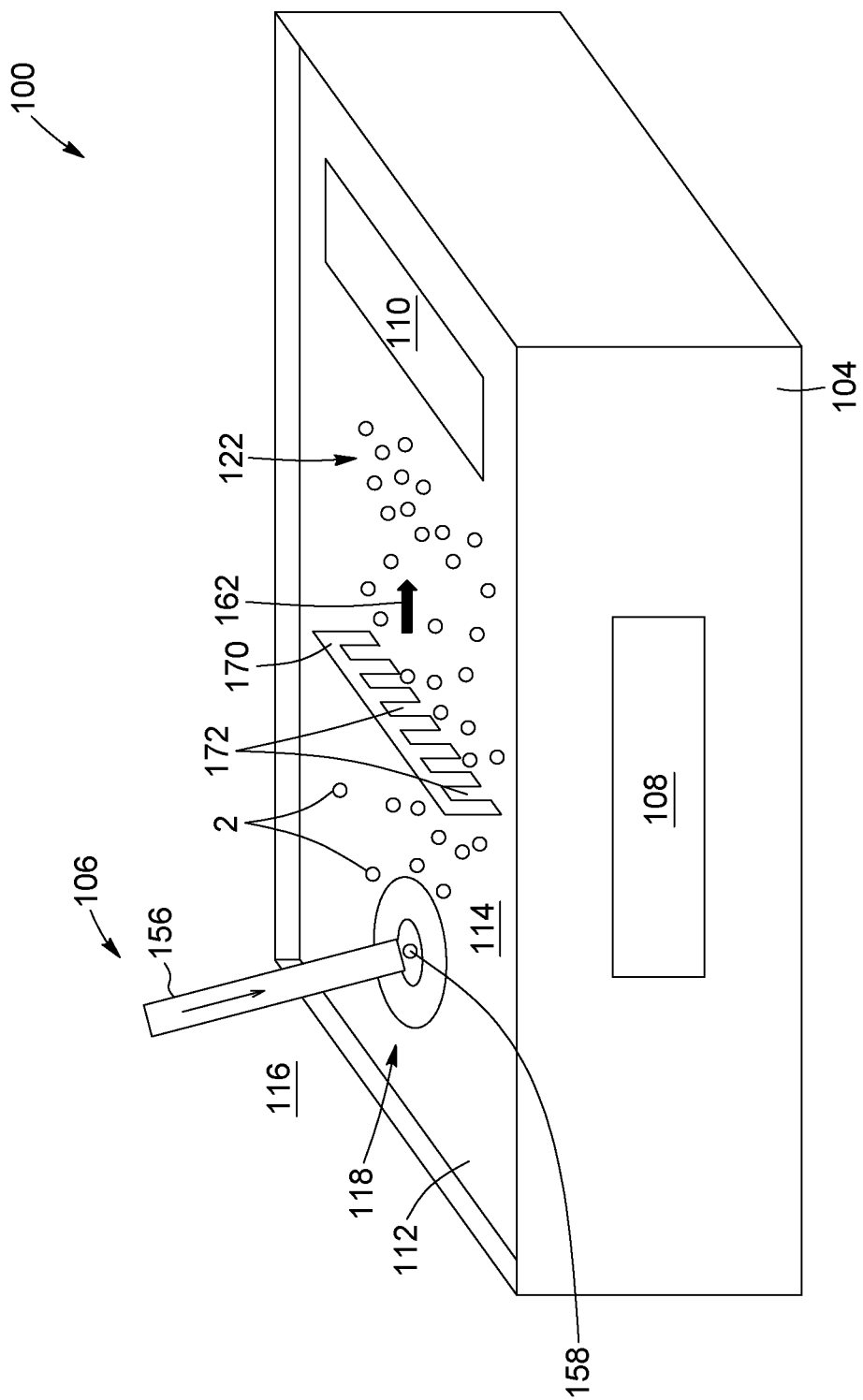
FIG. 10 is a schematic perspective view of a layering apparatus, in accordance with an exemplary embodiment, including a filter having a plurality of apertures.
Figure 11:
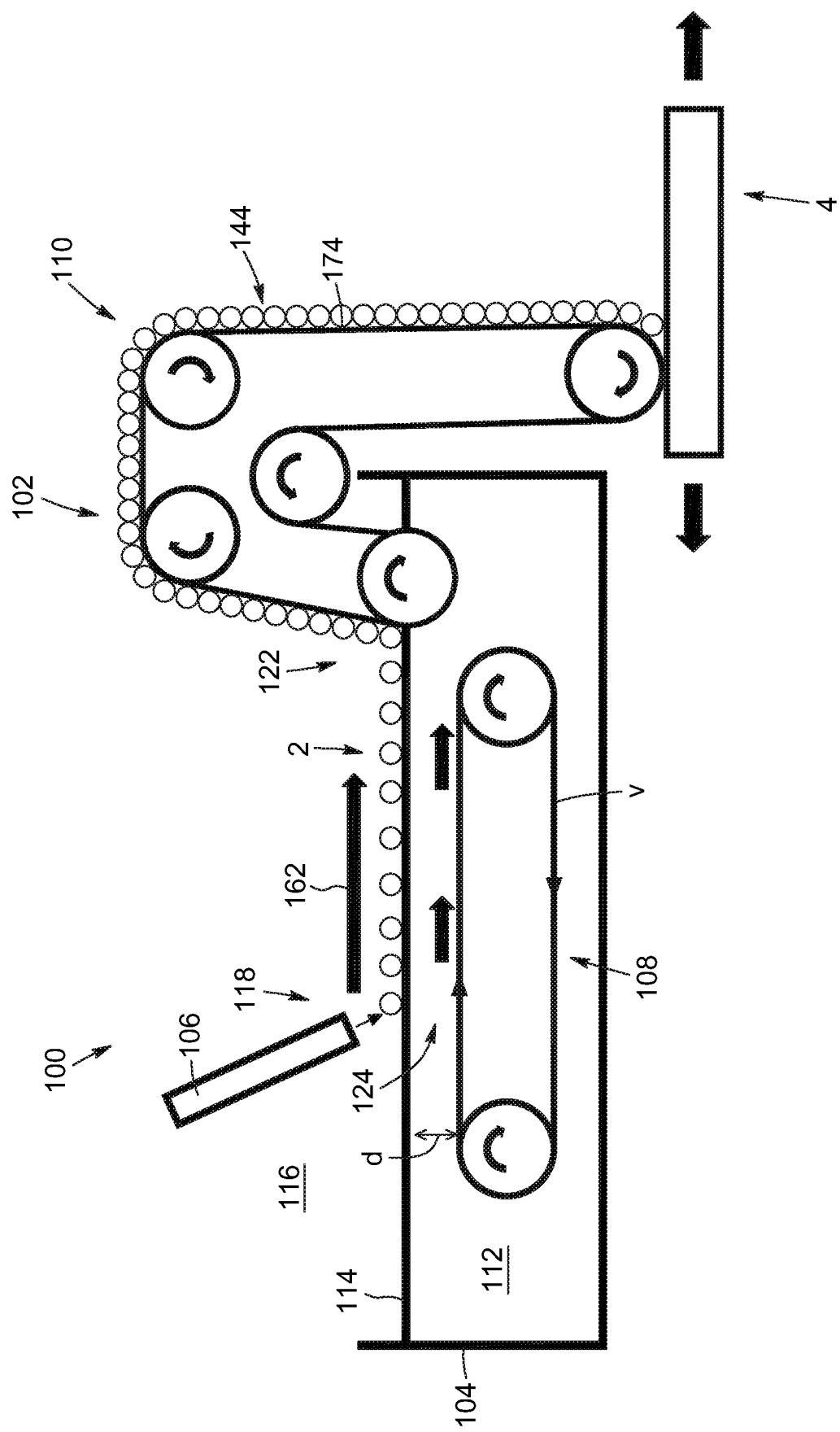
FIG. 11 is a schematic side view of a layering apparatus, in accordance with an exemplary embodiment.
Figure 12:
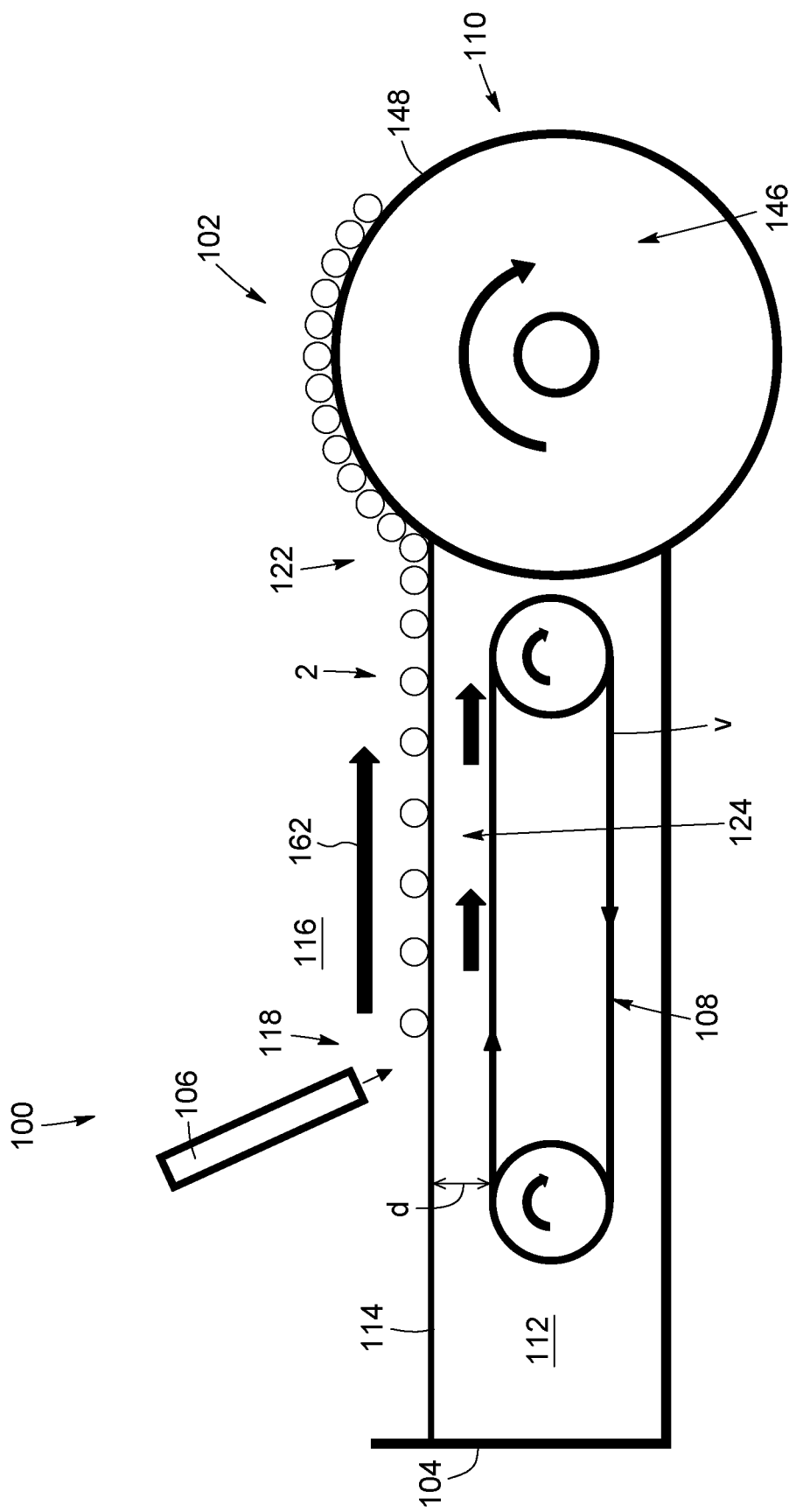
FIG. 12 is a schematic side view of a layering apparatus, in accordance with an exemplary embodiment.
Figure 13:
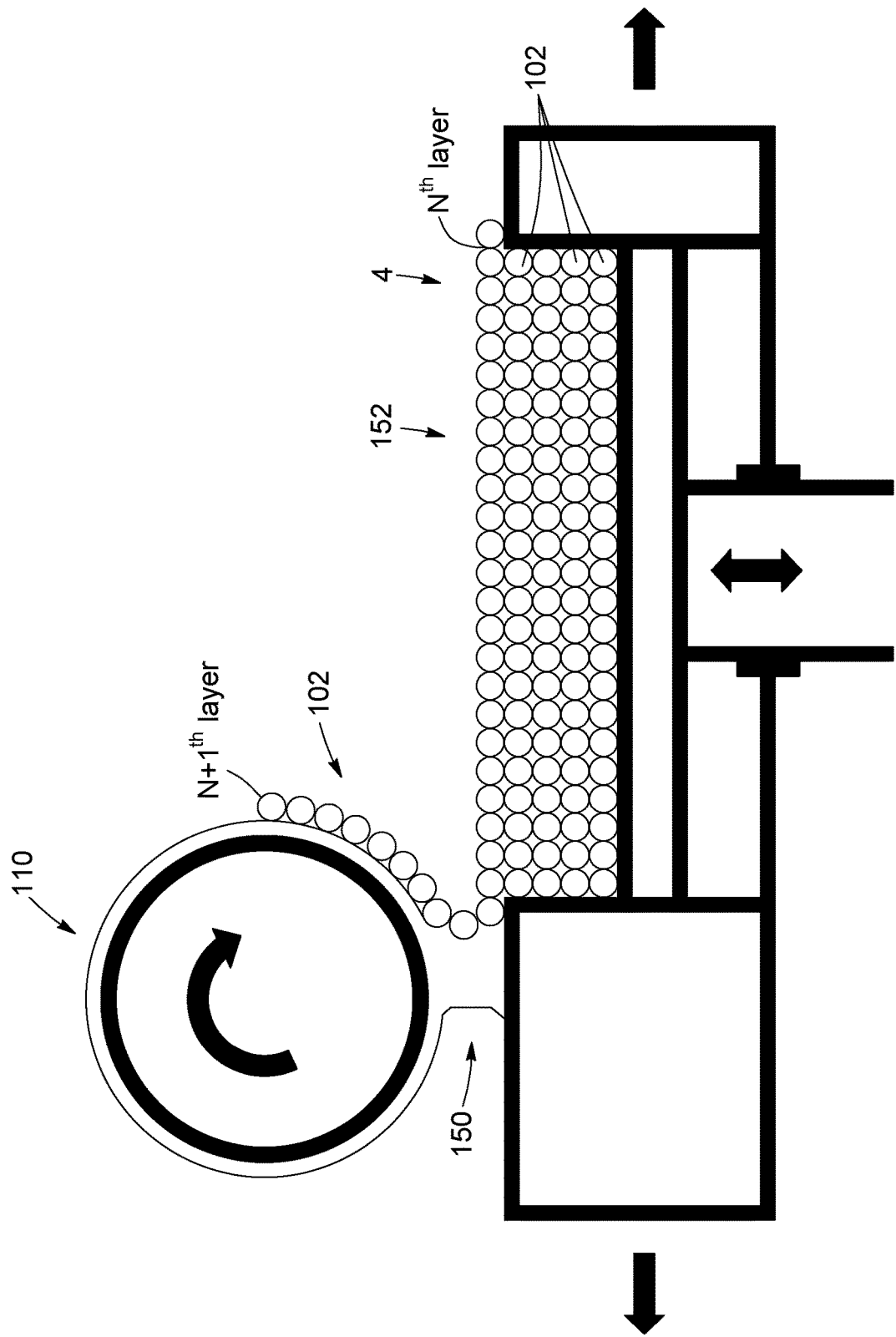
FIG. 13 is a schematic side view of the deposition, using a capillary bridge, of an $N+1^{th}$ layer on top of the $N^{th}$ layer of the multilayer stack already formed, in accordance with an exemplary embodiment.
Figure 14A:
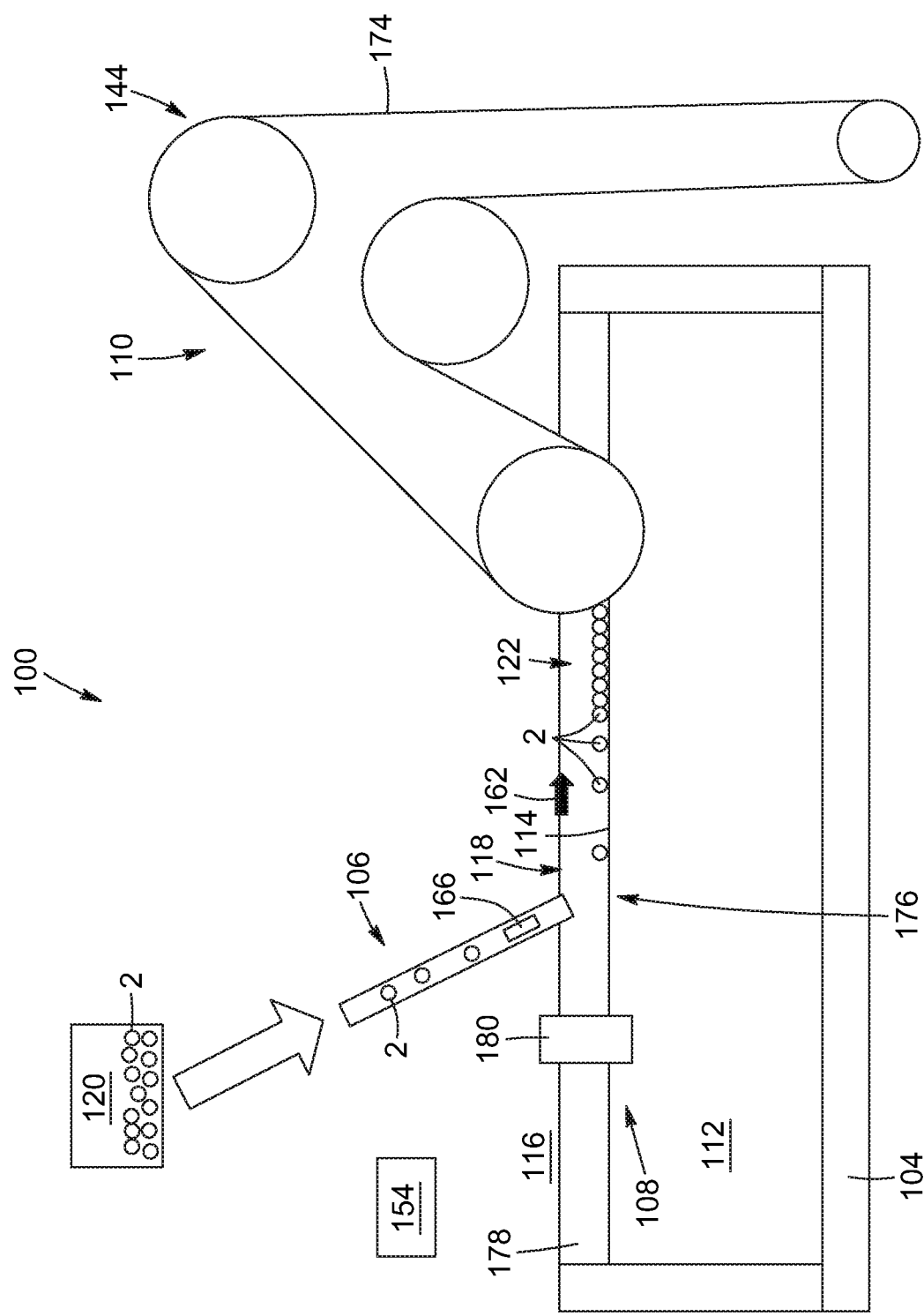
FIGS. 14A to 14E illustrate steps of a method for forming a particle layer, in accordance with an exemplary embodiment
Figure 14B:
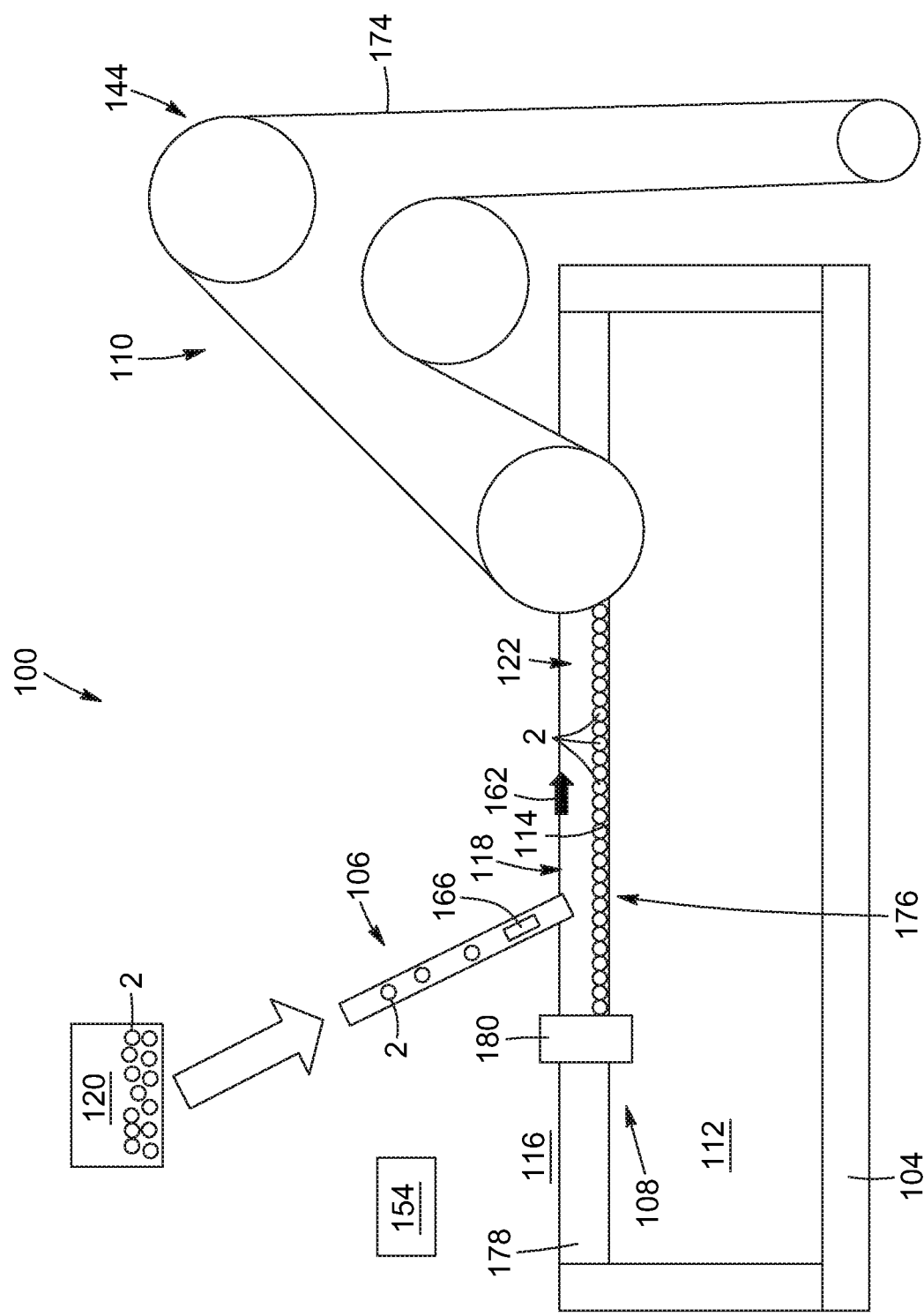
Figure 14C:
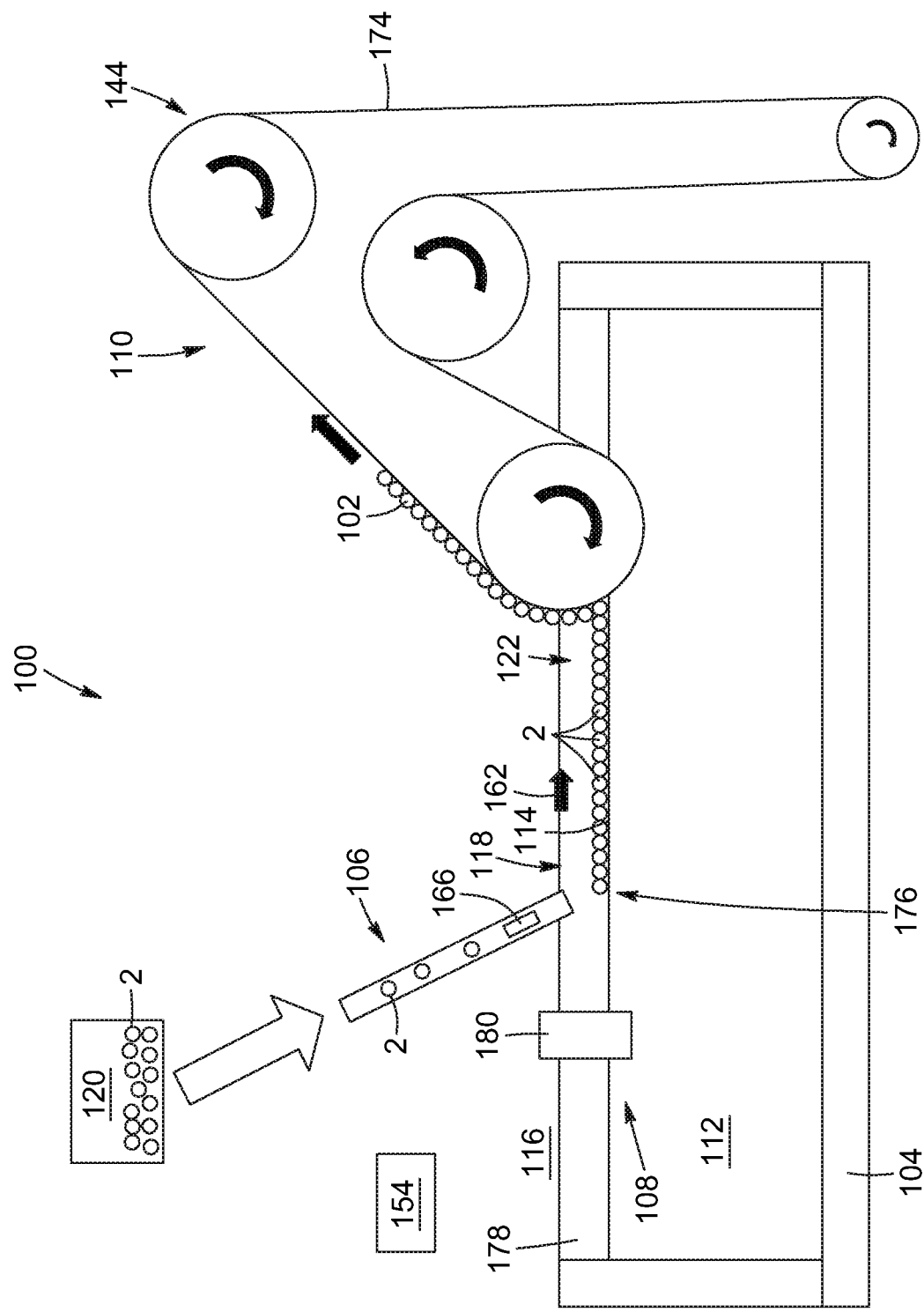
Figure 14D:
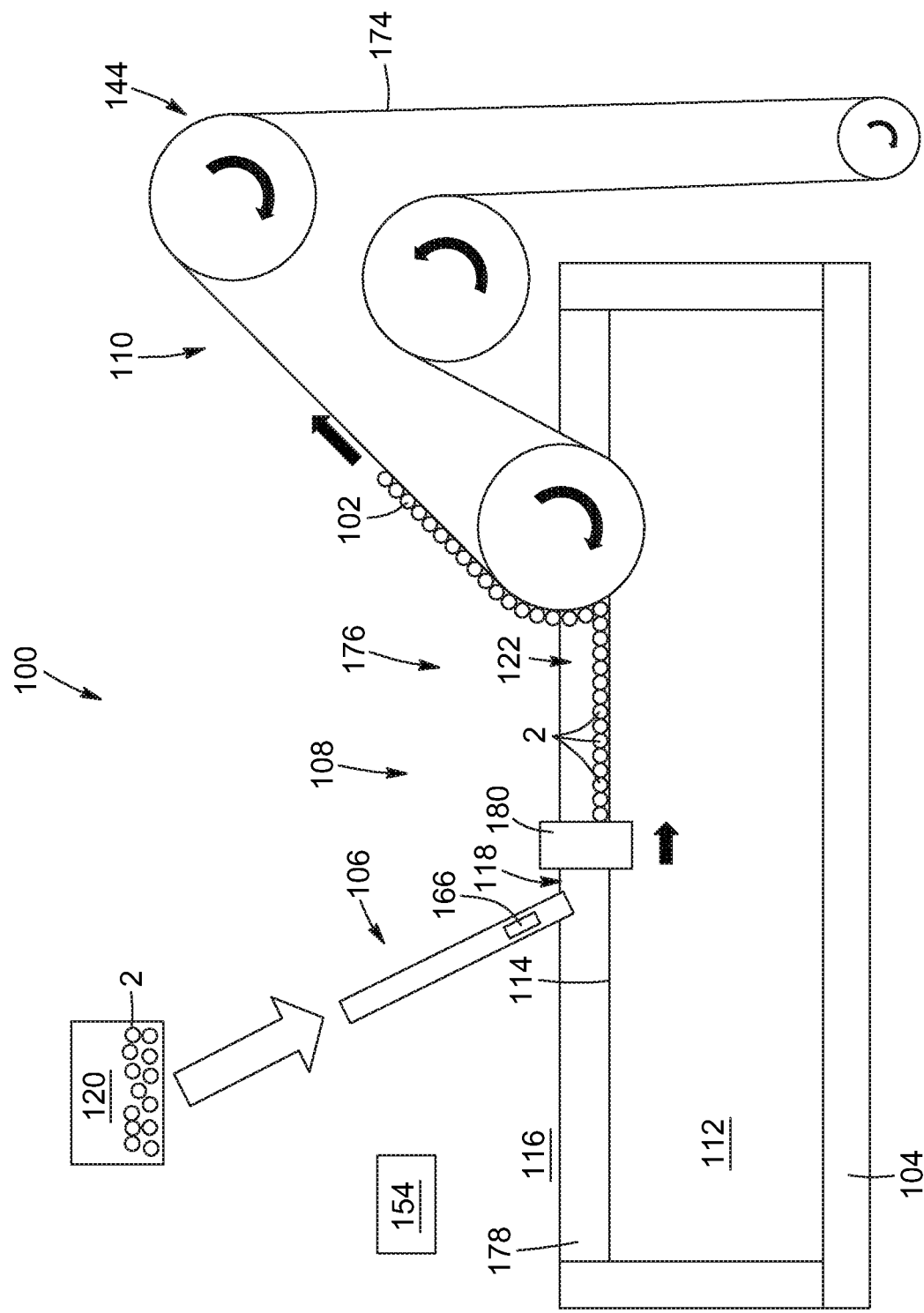
Figure 14E:
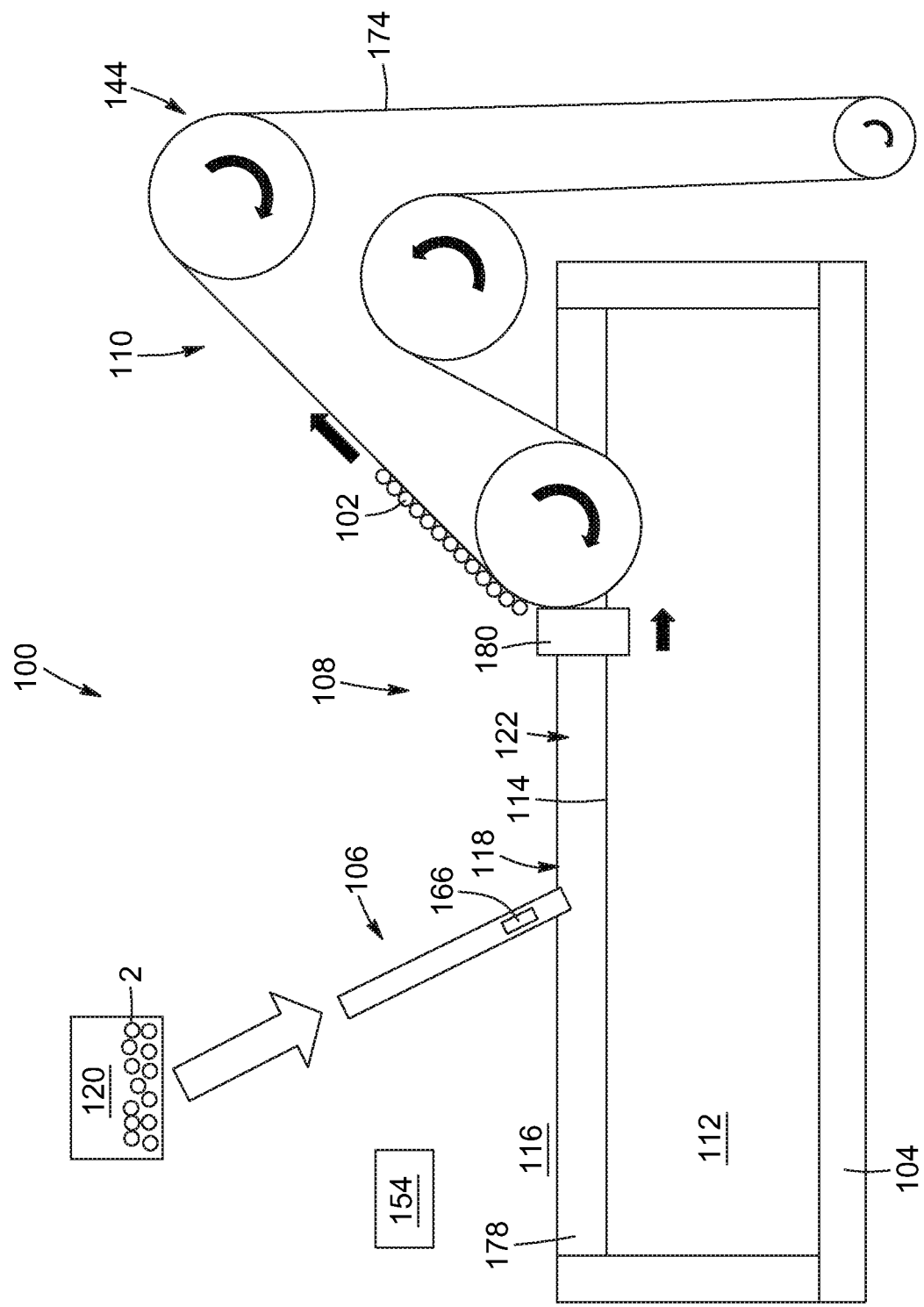

Turning to FIG. 6, in some implementations, the control of the flow of an upper portion 124 of the carrier liquid 112 is caused by the displacement of a component or surface 126 of the flow control assembly 108 located at an operating depth d below the gas-liquid interface 114 and being operated at an operating speed v parallel to the gas-liquid interface 114. In such a configuration, due to the inherent viscosity p of the carrier liquid 112, the displacement of the component or surface 126 produces a force F acting on the particles 2 along the gas-liquid interface 114. In some implementations, the force F acting on a region of surface A of the gas-liquid interface 114 can be expressed as follows: $F/A = \mu v/d$, where F/A represents a pressure P acting on the particles 2. For example, in a non-limiting embodiment where the carrier liquid 112 is characterized by a relatively low viscosity (e.g., less than 10 centipoises), the depth d of the moving substrate 126 under the gas-liquid interface 114 can be less than one centimeter (e.g. of the order of a few millimeters or less) to produce a pressure P that is large enough to transport the particles efficiently to the layer formation zone. It is noted that the equation $F/A = \mu v/d$ is generally applicable to Newtonian fluids, and is provided herein for illustrative purposes only. Indeed, the present techniques are generally applicable to both Newtonian and non-Newtonian fluids. Moreover, depending on the particular application or use, different analytical equations and models can be used to describe, compute and analyze the force acting on the particles at the gas-liquid interface.

Returning to FIG. 4, in some exemplary non-limiting implementations, the flow control assembly 108 can include at least one flow control device 128, that is, either a single or a plurality of flow control devices. For example, in some implementations, the at least one flow control device 128 can be embodied by one or more belt conveyors disposed in the carrier liquid 112 at an operating depth d below the gas-liquid interface 114. Each belt conveyor can include a set of rollers or pulleys 130, at least one of which being a powered roller, and an endless conveyor belt 132 mounted for movement about the rollers 130. In some implementations, the one or more moving belt conveyors 128 can be configured or operable to control at least one of the rate or speed at which the layer 102 is formed, the pressure inside the layer 102, the thickness of the layer 102, the density of the layer 102, and the accumulation of particles 2 at the layer formation zone 122.

Referring to FIG. 7, it will be appreciated that the provision of a plurality of independently controlled flow control devices 128 (e.g. belt conveyors) submerged in the carrier liquid 112 can enhance the uniformity of the formed layer, in particular at the lateral edge thereof. More particularly, the provision of a plurality of independently controlled belt conveyors 128 submerged in the carrier liquid 112 can be used to create a controlled traffic jam or restriction of particles 2 at the layer formation zone 122 (and thus a side pressure control), as well as to correct pressure and accumulation inequalities due to the method of injection or other sources of inequalities in the layering process. Depending on the application, the various flow control devices 128 may or may not be identical. That is, the flow control devices 128 may or may not all have the same operating depth, operating speed, dimensions, and/or orientation. For example, when the plurality of flow control devices 128 extends in a side-by side relationship parallel to the particle flow path 162, such as depicted in FIG. 7, it may be advantageous that the operating speed of the flow control devices 128 located near the edge of the vessel 104 be different than the operating speed of the flow control devices 128 located near the center of the vessel 104. In some implementations, different operating speed profiles can be envisioned for the plurality of flow control devices 128. In some implementations, the operating speeds of the flow control devices 128 can be adjusted based on the injection parameters (e.g., location, single-point versus multipoint, and the like).

Referring to FIG. 8, there is shown another exemplary implementation for the flow control assembly 108. In this implementation, the flow control assembly 108 includes a fixed substrate 134 submerged in the carrier liquid 112 at a certain depth below the gas-liquid interface 114 and a pump 136 submerged at least partly in the carrier liquid 112 upstream of the injection zone 118. The space between the upper surface 168 of the fixed substrate 134 and the gas-liquid interface 114 corresponds to an upper portion 124 of the carrier liquid 112, which is set into motion by the action of the pump 136 and entrains therewith the particles 2 toward the layer formation zone 122 where the particles 2 accumulate and gradually form the layer 102. In the illustrated embodiment, the pump 136 is disposed on the top surface 168 of the fixed substrate 134 upstream of the injection zone 118.

In FIG. 4, in some implementations, the layering apparatus 100 may include a barrier or back surface component 138 located at least partly upstream (i.e., behind) of the injection zone 118 and configured to promote or facilitate to promote the flow of the particles 2 downstream along a particle flow path 162. FIGS. 9A to 9C illustrate three exemplary shapes for the upstream barrier 138 in the case of a single injection point 158 of particles 2 in the injection zone 118. In FIGS. 9A and 9B, the upstream barrier 138 is concave facing downstream and will act to reflect or redirect in a generally downstream direction (i.e., along the particle flow path 162) incoming particles 2 moving initially radially outwardly from the injection point 158 in a generally upstream direction (i.e., opposite the particle flow path 162). In FIG. 9A, the upstream barrier 138 is curved (e.g., parabolic), while in FIG. 9B the upstream barrier 138 is made of two sheet portions 140 meeting at a common edge 142. In FIG. 9C, the upstream barrier 138 is flat and perpendicular to the particle flow path 162. In such a case, the upstream barrier can be embodied by the upstream edge of the vessel or by another component.

In some implementations, the control of the flow of the carrier liquid along the gas-liquid interface to carry the particles downstream from the injection zone to a layer formation zone can involve limiting or mitigating a phenomenon of blast injection at the gas-liquid interface. Blast injection can arise when a particle suspension or solution is injected at a single point in the injection zone. In some implementations where blast injection is observed, the suspension liquid or solvent in which the particles are suspended or dissolved, creates, at the point of contact with the carrier liquid at or near the gas-liquid interface, a wave expansion effect due to vapor pressure and/or other physicochemical phenomena. The wave expansion effect tends to push the particles to follow the hydrodynamic pressure of the suspension liquid or solvent at the injection point. As a result, the expansion of the suspension liquid or solvent tends to be radial, starting in all directions from the point of injection and creating, in some implementations, unwanted and/or detrimental differences in lateral pressure in the manufacture of the particle layer, for example at a downstream end or edge of the vessel or bath containing the carrier liquid. In some implementations, the step of limiting or containing the phenomenon of blast injection at the gas-liquid interface includes adjusting the flow of the carrier liquid along the gas-liquid interface in accordance with a wave expansion rate of the particles injected in the injected zone, for example by adjusting the flow of the carrier liquid to have a higher flow velocity than the wave expansion rate. Referring to FIG. 10, in other implementations, the phenomenon of blast injection can be reduced or at least controlled by providing a filter 170 between the injection zone 118 and the layer formation zone 122. In the illustrated embodiment, the filter 170 includes a linear array of apertures 172 oriented perpendicularly to the particle flow path 162 and configured to damp the injection disturbance of the gas-liquid interface by the particles injection process so as to ensure layer quality. It will be understood that providing a filter such as depicted in FIG. 10 can be useful to control the phenomenon of blast injection because it reduces wave propagation at the interface created by the blast injection due to a controlled jamming effect reducing free propagation solvents, waves and particles, before being carried out toward the layer formation zone and transferred.

Returning to FIG. 2, the method 200 also includes a step 206 of accumulating the particles in the layer formation zone to gradually form the particle layer on the gas-liquid interface, and a step 208 of withdrawing the particle layer from the layer formation zone. In some implementations, the accumulating step 206 can include a step of restricting the flow of the carrier liquid in the layer formation zone 122. In some implementations, the withdrawing step 208 is performed gradually and concurrently with the accumulating step 206. In other implementations, the withdrawing step is performed only once the particle layer or a portion thereof has been fully formed. In some of these other implementations, the method can include, once the particle layer is fully formed and during the removing step, the steps of stopping the injecting step and pushing downstream the particle layer against an upstream edge thereof. In some implementations, the withdrawing step comprises a step of controlling a lateral pressure in the particle layer. This control over the lateral pressure in the particle layer can involve adjusting a ratio between the flow of the carrier liquid along the gas-liquid interface and a withdrawal rate of the particle layer from the layer formation zone.

In FIG. 4, the transfer assembly 110 is configured to withdraw the formed particle layer 102 from the layer formation zone 122 to another location. The transfer assembly 110 can also be the component or barrier of the layering apparatus 100 onto or against which the particles 2 accumulate in the layer formation zone 122 to gradually form the particle layer 102. Returning briefly to FIG. 3, it will be appreciated that when the layering apparatus 100 is used in an additive manufacturing system 1, the transfer assembly 110 is configured to withdraw the formed particle layer 102 from the layer formation zone 122 to the working zone 4 where the 3D object 40 is to be fabricated. It will also be appreciated that in order to deposit the particle layer 102 in the working zone 4 efficiently, the transfer of the formed particle layer 102 can be advantageously timed or synchronized to ensure the layer transfer speed is substantially the same as the relative speed between the transfer assembly 110 and the layer receiving area on the working zone 4. It can also be advantageous for the lateral pressure applied to the formed particle layer 102 to remain substantially constant throughout the entire transferring process, thus favoring a constant layer density.

Depending on the particular application or use, the transfer assembly 110 can withdraw the formed particle layer 102 from the layer formation zone 122 either concurrently with the accumulation of the particles 2 in the layer formation zone 122 and the gradual formation of the layer 102 on the gas-liquid interface 114, or only after the full particle layer 102, or a portion thereof, has been formed.

Referring still to FIG. 4, but also to FIG. 11, in some implementations, the transfer assembly 110 can include a transfer belt conveyor 144 including a conveyor belt 174. The transfer belt conveyor 144 is positioned at the downstream edge of the layer formation zone 122 and operable to convey, along the belt conveyor 174, the formed particle layer 102 out of the layer formation zone 122 and to another location for further processing or storage. For example, the other location can be the working zone 4 of an additive manufacturing system 1, as in FIG. 3, or another location. In some implementations, the belt conveyor 144 of the transfer assembly 110 can be driven at a constant speed in order to maintain a constant lateral pressure inside the particle layer 102 during its transfer. Of course, in other embodiments the belt conveyor 144 of the transfer assembly 110 may not be driven at a constant speed.

Referring now to FIG. 12, in another implementation, the transfer assembly 110 can include a rotatable cylinder 146 positioned at the downstream edge of the layer formation zone 122 and operable to transport, along its peripheral surface 148, the formed particle layer 102 out of the layer formation zone 122 and to another location for further processing or storage. Again, referring to FIG. 3, the other location can be the working zone 4 of an additive manufacturing system 1. In some implementations, the cylinder 146 can be rotated at a constant angular speed so as to maintain a constant lateral pressure inside the particle layer 102 during its transfer.

It is noted that in the present techniques, the particle layer 102 is generally not formed on the transfer assembly 110 (e.g., transfer belt conveyor 144 in FIG. 11 and the rotatable cylinder in FIG. 12), but is formed instead in the layer formation zone 122 provided upstream of the transfer assembly 110. In other words, the particle layer 102 is generally already formed when it is conveyed on the transfer assembly 110.

Referring to FIG. 13, in another implementation, the transfer assembly 110 can form a capillary bridge 150 to deposit the formed particle layer 102 gently and smoothly on top of a multilayer stack 152 of previously withdrawn, transferred and deposited layers 102, for example in the working zone 4 of an additive manufacturing system. FIG. 13 also provides a schematic representation of the deposition of an $N+1^{th}$ particle layer on top of an $N^{th}$ layer of a previously formed multilayer stack 152.

Referring to FIGS. 14A to 14E, in some implementations, the flow control assembly 108 need not include a belt conveyor or a fixed substrate submerged in the carrier liquid 112 below the gas-liquid interface 114. For example, in some implementations, a restricted region 176 on the gas-liquid interface 114 can be delimited by a transfer belt conveyor 144 of the transfer assembly 110, the lateral sidewalls 178 of the vessel 104, and a movable barrier 180 located upstream of injection zone 118 (FIG. 14A). The movable barrier 180 is at least partly submerged in the carrier liquid 112 and is part of the flow control assembly 108. This restricted region 176 includes the layer formation zone 122 and the injection zone 118. During the accumulation of the injected particles 2 in the layer formation zone 122, the transfer belt conveyor 144 can remain stationary until the restricted region 176 is fully covered by particles 2 (FIG. 14B). Once full coverage of the restricted region 176 is achieved, the transfer belt conveyor 144 can start to move and convey excess particles 2 (i.e., the formed layer 102) out of the layer formation zone 122 (FIG. 14C). The conveying motion of the transfer belt conveyor 144 can be adjusted such that the withdrawal rate of particle layer 102 leaving the restricted region 176 matches the injection rate of particles 2 entering the restricted region 176. At the end of the layer fabrication process, particle injection stops and the movable barrier 180 can be displaced downstream along the gas-liquid interface 114 and toward the transfer belt conveyor 144, thus progressively reducing the surface area of the restricted region 176 at a rate which can be set equal to the particle withdrawal rate (FIG. 14D). The process can be stopped when all particles 2 have been withdrawn and the movable barrier 180 has reached the transfer belt conveyor 144 (FIG. 14E).

In some implementations, the present techniques can include a step of performing a specific monitoring of the layer formation process. In some scenarios, this step can involve monitoring a sort of "traffic jam" effect, which can impede or restrict the flow or motion of the particles, lead to their accumulation in the layer formation zone, and result in the formation of the particle layer. In such scenarios, the monitoring of the layer formation process can involve a monitoring of the injection zone where the particles (e.g., in the form of a powder, a suspension or a solution) are injected at the gas-liquid interface. For example, in some implementations, the accumulating step includes monitoring a profile of the gas-liquid interface along the particle flow path as the particles accumulate in the layer formation zone.

In some implementations, the layered particles can have an average size ranging from the millimeter scale down to the nanometer scale, covering six orders of magnitude in size. It will be appreciated that different types of particles and different types of energy beams, particle beams or adhesion promoters can be used depending, for example, on the desired or required thickness, functionalities, structure and/or properties of the layers to be formed. It will also be appreciated that when the layering apparatus is used in an additive manufacturing system, the injection, flowing, layer fabrication and layer transferring steps are generally repeated successively for a plurality of layering stages. A cleaning assembly can be provided where the unused particles are taken back and stored for reutilization.

In some implementations, the layering apparatus can include a control unit or processing unit (not shown) implemented in hardware and/or software and operable to control and execute, at least partially, the functions required to operate the different components of the layering apparatus, such as the injection assembly, the flow control assembly and/or the transfer assembly. For example, the control unit can be operable to control the amount of solution/suspension to be delivered by the injection assembly and/or the flow and the lateral pressure imparted by the flow control assembly, and, in turn, to control the density and the thickness of the resulting particle layer.

Of course, numerous modifications could be made to the embodiments described above without departing from the scope of the appended claims. Several alternative embodiments and examples have been described and illustrated herein. The embodiments described above are intended to be exemplary. One skilled in the art would appreciate the features of the individual embodiments, and the possible combinations, variations and omissions of the components. One skilled in the art would further appreciate that any of the embodiments could be provided in any combination with the other embodiments disclosed herein. It is understood that the techniques disclosed herein may be embodied in other specific forms without departing from the central characteristics thereof. The present examples and embodiments, therefore, are to be considered in all respects as illustrative and not restrictive, and the present techniques are not to be limited to the details given herein. Accordingly, while the specific embodiments have been illustrated and described, numerous modifications come to mind without significantly departing from the scope of the appended claims.

The invention claimed is:

1. A method for forming a particle layer, the method comprising the steps of:
 providing an apparatus for forming a particle layer, the apparatus comprising:
  a vessel for receiving a carrier liquid;
  an injection assembly;
  a flow control assembly disposed in the vessel such that, when the carrier liquid is present in the vessel, the flow control assembly is submerged at least partly in the carrier liquid, wherein the flow control assembly comprises at least one flow control device and wherein the at least one flow control device comprises at least one belt conveyor; and
  a transfer assembly:
 injecting, using the injection assembly, particles in an injection zone defined at a gas-liquid interface between the carrier liquid received in the vessel and an ambient gas;
 controlling, using the flow control assembly, a flow of an upper portion of the carrier liquid along the gas-liquid interface to carry the particles downstream along a particle flow path from the injection zone to a layer formation zone, wherein the upper portion of the carrier liquid extends from the gas-liquid interface down to an operating depth below the gas-liquid interface, and wherein each flow control device is located at the operating depth and operated at an operating speed parallel to the gas-liquid interface;
 accumulating the particles in the layer formation zone to gradually form the particle layer on the gas-liquid interface; and
 withdrawing, using the transfer assembly, the particle layer from the layer formation zone.

2. The method of claim 1, wherein the injecting step comprises injecting the particles in the injection zone at a single injection point, at a plurality of spaced-apart injection points in the injection zone, or along an injection line.

3. The method of claim 1, wherein the controlling step comprises controlling the flow of the carrier liquid substantially without gravity flow.

4. The method of claim 1, wherein the controlling step of comprises selecting at least one of the operating depth and the operating speed based on a viscosity of the carrier liquid.

5. The method of claim 1, wherein the accumulating step comprises a step of restricting the flow of the carrier liquid in the layer formation zone.

6. The method of claim 1, wherein the withdrawing step comprises a step of removing the particle layer gradually and concurrently with the accumulating step or only once the particle layer or a portion thereof is fully formed.

7. The method of claim 1, wherein the withdrawing step comprises a step of controlling a lateral pressure in the particle layer.

8. The method of claim 7, wherein the step of controlling the lateral pressure in the particle layer comprises adjusting a ratio between the flow of the carrier liquid along the gas-liquid interface and a withdrawal rate of the particle layer from the layer formation zone.

9. The method of claim 1, wherein the particles are between about 1 nanometer and about 100 micrometers in diameter.

10. An additive manufacturing method for fabricating a three-dimensional (3D) object, comprising the steps of:
forming a particle layer using the method of claim 1;
transferring the particle layer withdrawn from the layer formation zone to a working zone;
joining a predetermined portion of the transferred layer together in a selective manner to form, in the working zone, one of a plurality of discrete cross-sectional regions that cumulatively form the 3D object; and
repeating the forming, transferring and joining steps a plurality of times to stack the plurality of discrete cross-sectional regions one on top of the other, and build up, layer by layer, the 3D object.

11. An apparatus for forming a particle layer, the apparatus comprising:
a vessel for receiving a carrier liquid such that, when the carrier liquid is present in the vessel, the carrier liquid defines a gas-liquid interface with an ambient gas;
an injection assembly configured to inject particles in an injection zone defined at the gas-liquid interface;
a flow control assembly disposed in the vessel such that, when the carrier liquid is present in the vessel, the flow control assembly is submerged at least partly in the carrier liquid and configured to control a flow of the carrier liquid along the gas-liquid interface, the flow of the carrier liquid carrying the particles downstream along a particle flow path from the injection zone to a layer formation zone where the particles accumulate and gradually form the particle layer on the gas-liquid interface; and
a transfer assembly configured to withdraw the formed particle layer from the layer formation zone
wherein the flow control assembly is configured to control a flow of an up per portion of the carrier liquid extending from the gas-liquid interface down to an operating depth below the gas-liquid interface,
wherein the flow control assembly comprises at least one flow control device, each flow control device being located at the operating depth and being operated at an operating speed parallel to the gas-liquid interface, and
wherein the at least one flow control device comprises at least one belt conveyor.

12. The apparatus of claim 11, wherein the injection assembly comprises a single injector.

13. The apparatus of claim 11, wherein the injection assembly comprises a plurality of injectors.

14. The apparatus of claim 11, wherein the flow control assembly is configured to control the flow of the carrier liquid along the gas-liquid interface substantially without gravity flow.

15. The apparatus of claim 11, wherein the at least one flow control device consists of a plurality of flow control devices.

16. The apparatus of claim 11, wherein the flow control assembly comprises a fixed substrate submerged in the carrier liquid and a pump submerged at least partly in the carrier liquid upstream of the injection zone.

17. The apparatus of claim 11, wherein the transfer assembly comprises a barrier against which the particles accumulate particles and gradually form the particle layer on the gas-liquid interface.

18. The apparatus of claim 11, wherein the transfer assembly comprises a rotating cylinder having a peripheral surface, the rotating cylinder being located at a downstream end of the layer formation zone and configured to convey the particle layer out of the layer formation zone along the peripheral surface thereof.

19. The apparatus of claim 11, wherein the transfer assembly comprises a belt conveyor including a conveyor belt, the belt conveyor being located at a downstream end of the layer formation zone and configured to convey the particle layer out of the layer formation zone along the conveyor belt.

20. The apparatus of claim 11, further comprising a barrier located at least partly upstream of the injection zone and configured to promote the flow of the particles downstream along the particle flow path.

21. The apparatus of claim 20, wherein the barrier is movable and configured to move downstream along the particle flow path to push the particle layer toward and onto the transfer assembly for withdrawal of the same.

22. The apparatus of claim 11, wherein the transfer assembly is configured to form a capillary bridge between the transfer assembly and a working zone to deposit the particle layer onto the working zone.

23. A method for forming a particle layer, the method comprising the steps of:
providing an apparatus for forming a particle layer, the apparatus comprising:
a vessel for receiving a carrier liquid;
an injection assembly;
a flow control assembly disposed in the vessel such that, when the carrier liquid is present in the vessel, the flow control assembly is submerged at least partly in the carrier liquid;
a transfer assembly; and
a movable barrier;
injecting, using the injection assembly, particles in an injection zone defined at a gas-liquid interface between the carrier liquid received in the vessel and an ambient gas;
controlling, using the flow control assembly, a flow of the carrier liquid along the gas-liquid interface to carry the particles downstream along a particle flow path from the injection zone to a layer formation zone;
accumulating the particles in the layer formation zone to gradually form the particle layer on the gas-liquid interface;
moving, from a location at least partly upstream of the injection zone, the movable barrier downstream along the particle flow path to promote the flow of the particles downstream along the particle flow path and push the particle layer toward and onto the transfer assembly for withdrawal of the same; and
withdrawing, using the transfer assembly, the particle layer from the layer formation zone.

24. An additive manufacturing method for fabricating a three-dimensional (3D) object, comprising the steps of:
forming a particle layer using the method of claim 23;
transferring the particle layer withdrawn from the layer formation zone to a working zone;

joining a predetermined portion of the transferred layer together in a selective manner to form, in the working zone, one of a plurality of discrete cross-sectional regions that cumulatively form the 3D object; and repeating the forming, transferring and joining steps a plurality of times to stack the plurality of discrete cross-sectional regions one on top of the other, and build up, layer by layer, the 3D object.

25. An apparatus for forming a particle layer, the apparatus comprising:

a vessel for receiving a carrier liquid such that, when the carrier liquid is present in the vessel, the carrier liquid defines a gas-liquid interface with an ambient gas;

an injection assembly configured to inject particles in an injection zone defined at the gas-liquid interface;

a flow control assembly disposed in the vessel such that, when the carrier liquid is present in the vessel, the flow control assembly is submerged at least partly in the carrier liquid and configured to control a flow of the carrier liquid along the gas-liquid interface, the flow of the carrier liquid carrying the particles downstream along a particle flow path from the injection zone to a layer formation zone where the particles accumulate and gradually form the particle layer on the gas-liquid interface;

a transfer assembly configured to withdraw the formed particle layer from the layer formation zone; and a barrier located at least partly upstream of the injection zone and configured to promote the flow of the particles downstream along the particle flow path, wherein the barrier is movable and configured to move downstream along the particle flow path to push the particle layer toward and onto the transfer assembly for withdrawal of the same.

* * * * *